United States Patent
Cheng et al.

(10) Patent No.: US 12,429,878 B1
(45) Date of Patent: Sep. 30, 2025

(54) SYSTEMS AND METHODS FOR DYNAMIC OBJECT REMOVAL FROM THREE-DIMENSIONAL DATA

(71) Applicant: Aurora Operations, Inc., Pittsburgh, PA (US)

(72) Inventors: Ricson Cheng, Bridgewater, NJ (US); Adam Wlodzimierz Harley, Pittsburgh, PA (US); Justin Liang, Toronto (CA); Xinchen Yan, San Mateo, CA (US); Raquel Urtasun, Toronto (CA); Mehmet Ersin Yumer, San Francisco, CA (US)

(73) Assignee: AURORA OPERATIONS, INC., Pittsburgh, PA (US)

(*) Notice: Subject to any disclaimer, the term of this patent is extended or adjusted under 35 U.S.C. 154(b) by 830 days.

(21) Appl. No.: 17/340,870

(22) Filed: Jun. 7, 2021

Related U.S. Application Data

(60) Provisional application No. 63/035,577, filed on Jun. 5, 2020.

(51) Int. Cl.
*G05D 1/00* (2024.01)
*G01S 17/89* (2020.01)
(Continued)

(52) U.S. Cl.
CPC ............ *G05D 1/0219* (2013.01); *G01S 17/89* (2013.01); *G05D 1/0221* (2013.01);
(Continued)

(58) Field of Classification Search
CPC .. G05D 1/0219; G05D 1/0221; G05D 1/0248; G05D 2201/0213; G01S 17/89; G06N 20/00; G06V 20/58
See application file for complete search history.

(56) References Cited

U.S. PATENT DOCUMENTS

2020/0218961 A1* 7/2020 Kanazawa ............... H04L 12/40
2021/0261148 A1* 8/2021 Li .......................... G06V 20/584

OTHER PUBLICATIONS

Arjovsky et al., "Wasserstein GAN", arXiv:1701.07875v3, Dec. 6, 2017, 32 pages.

(Continued)

*Primary Examiner* — Khoi H Tran
*Assistant Examiner* — Trang Dang
(74) *Attorney, Agent, or Firm* — Dority & Manning, P.A.

(57) ABSTRACT

Systems and methods for generating simulation data based on real-world environments are provided. A method includes obtaining multi-modal sensor data indicative of a dynamic object within an environment of a robotic platform. The multi-modal sensor data is associated with a plurality of timesteps including a first timestep and a second timestep. The method includes providing the multi-modal sensor data indicative of the dynamic object within the environment as an input to a machine-learned dynamic object removal model. And, the method includes receiving as an output of the machine-learned dynamic object removal model, in response to receipt of the multi-modal sensor data, a scene representation indicative of at least a portion of the environment including a reconstructed region based at least in part on removal of the dynamic object and multiple levels of granularity. The scene representation is used as a template for generating different simulations within the depicted environment.

20 Claims, 10 Drawing Sheets

(51) Int. Cl.
  *G06N 20/00* (2019.01)
  *G06V 20/58* (2022.01)
(52) U.S. Cl.
  CPC ........... *G05D 1/0248* (2013.01); *G06N 20/00* (2019.01); *G06V 20/58* (2022.01)

(56) References Cited

OTHER PUBLICATIONS

Barnes et al., "PatchMatch: A Randomized Correspondence Algorithm for Structural Image Editing", ACM Transactions on Graphics, 2009, vol. 28, 11 pages.
Behley et al., "SemanticKITTI: A Dataset for Semantic Scene Understanding of LiDAR Sequences", arXiv:1904.01416v3, Aug. 16, 2019, 17 pages.
Bousmalis et al., "Using Simulation and Domain Adaption to Improve Efficiency of Deep Robotic Grasping", IEEE International Conference on Robotics and Automation, May 21-25, 2018, Brisbane, Australia, pp. 4243-4250.
Casser et al., "Depth Prediction without the Sensors: Leveraging Structure for Unsupervised Learning from Monocular Videos", AAAI Conference on Artificial Intelligence, 2019, vol. 33, pp. 8001-8008.
Chang et al., "ShapeNet: An Information-Rich Model Repository", arXiv:1512.03012v1, Dec. 9, 2015, 11 pages.
Delage et al., "A dynamic Bayesian network model for autonomous 3d reconstruction from a single indoor image", IEEE Computer Society Conference on Computer Vision and Pattern Recognition, Jun. 17-22, 2006, New York, NY, 8 pages.
Denton et al., "Semi-Supervised Learning with Context-Conditional Generative Adversarial Networks", arXiv:1611.06430v1, Nov. 19, 2016, 10 pages.
Dosovitskiy et al., "CARLA: An Open Urban Driving Simulator", Conference on Robot Learning, Nov. 13-15, 2017, Mountain View, CA, 16 pages.
Efros et al., "Texture Synthesis by Non-parametric Sampling", IEEE International Conference on Computer Vision, Sep. 20-27, 1999, Kerkyra, Greece, 6 pages.
Eslami et al., "Neural scene representation and rendering", Science, Jun. 15, 2018, vol. 360, 8 pages.
Goodfellow et al., "Generative Adversarial Nets", Conference on Neural Information Processing Systems, Dec. 8-13, 2014, Montreal, Canada, 9 pages.
Gulrajani et al., "Improved Training of Wasserstein GANs", Conference on Neural Information Processing Systems, Dec. 4-9, 2017, Long Beach, CA, 11 pages.
Harley et al., "Learning from Unlabelled Videos Using Contrastive Predictive Neural 3D Mapping", International Conference on Learning Representations, Apr. 26-May 1, 2020, Virtual, 19 pages.
Hinton et al., "Transforming Auto-Encoders", International Conference on Artificial Neural Networks, Jun. 14-17, 2011, Espoo, Finland, pp. 44-51.
Hong et al., "Learning Hierarchical Semantic Image Manipulation through Structured Representations", Conference on Neural Information Processing Systems, Dec. 2-8, 2018, Montreal, Canada, 11 pages.
Iizuka et al., "Globally and Locally Consistent Image Completion", ACM Transactions on Graphics, 2017, vol. 36, No. 4, pp. 107:1-107:14.
Isola et al., "Image-to-Image Translation with Conditional Adversarial Networks", Conference on Computer Vision and Pattern Recognition, Jul. 21-26, 2017, Honolulu, Hawaii, pp. 1125-1134.
Kar et al., "Meta-Sim: Learning to Generate Synthetic Datasets", International Conference on Computer Vision, Oct. 27-Nov. 2, 2019, Seoul, Korea, pp. 4551-4560.
Kim et al., "Deep Video Inpainting", International Conference on Computer Vision, Oct. 27-Nov. 2, 2019, Seoul, Korea, pp. 5792-5801.
Kolve et al., "AI2-THOR: An Interactive 3D Environment for Visual AI", arXiv:1712.05474v3, Mar. 15, 2019, 4 pages.
Lee et al., "Context-Aware Synthesis and Placement of Object Instances", $32^{nd}$ Conference on Neural Information Processing Systems, Dec. 2-8, 2018, Montreal, Canada, 11 pages.
Lee et al., "Copy-and-Paste Networks for Deep Video Inpainting", International Conference on Computer Vision, Oct. 27-Nov. 2, 2019, Seoul, Korea, pp. 4413-4421.
Lee et al., "Geometric Reasoning for Single Image Structure Recovery, IEEE Computer Society Conference on Computer Vision and Pattern Recognition", Jun. 20-25, 2009, Miami Beach, FL, pp. 2136-2143.
Lee et al., "Inserting Videos into Videos", Conference on Computer Vision and Pattern Recognition, Jun. 16-20, 2019, Long Beach, CA, pp. 10061-10070.
Li et al., "Generative Face Completion", Conference on Computer Vision and Pattern Recognition, Jul. 21-26, 2017, Honolulu, HI, pp. 3911-3919.
Liu et al., "Image Inpainting for Irregular Holes Using Partial Convolutions", European Conference on Computer Vision. Sep. 8-14, 2018, Munich, Germany, 16 pages.
Malik et al., "The three R's of computer vision: Recognition, reconstruction and reorganization", Pattern Recognition Letters 72, 2016, pp. 4-14.
Newson et al., "Towards fast, generic video inpainting, CVMP2013: The $10^{th}$ European Conference on Visual Media Production", Oct. 17-21, 2021, Turin, Italy, 8 pages.
Oh et al., "Onion-Peel Networks for Deep Video Completion", International Conference on Computer Vision, Oct. 27-Nov. 2, 2019, Seoul, Korea, pp. 4403-4412.
Park et al., "Probabilistic Surfel Fusion for Dense LiDAR Mapping", International Conference on Computer Vision. Oct. 22-29, 2017, Venice Italy, pp. 2418-2426.
Pathak et al., "Context Encoders: Feature Learning and Inpainting", Conference on Computer Vision and Pattern Recognition, Jun. 26-Jul. 1, 2016, Las Vegas, NV, pp. 2536-2544.
Ros et al., "The SYNTHIA Dataset: A Large Collection of Synthetic Images for Semantic Segmentation of Urban Scenes", Proceedings of the IEEE Conference on Computer Vision and Pattern Recognition (CVPR), Jun. 27-30, 2016, Las Vegas, NV, pp. 3234-3243.
Sangkloy et al., "Scribbler: Controlling Deep Image Synthesis with Sketch and Color", Conference on Computer Vision and Pattern Recognition, Jul. 21-26, 2017, Honolulu HI, pp. 5400-5409.
Savva et al., "Habitat: A Platform for Embodied AI Research", International Conference on Computer Vision, Oct. 27-Nov. 2, 2019, Seoul, Korea, pp. 9339-9347.
Savva et al., "MINOS: Multimodal Indoor Simulator for Navigation in Complex Environments", arXiv:1712.03931v1, Dec. 11, 2017, 14 pages.
Shechtman et al., "Space-Time Super-Resolution", IEEE Transactions on Pattern Analysis and Machine Intelligence, vol. 27, No. 4, Apr. 2005, pp. 531-545.
Simonyan et al., "Very Deep Convolutional Networks for Large-Scale Image Recognition", arXiv:1409.1556v6, Apr. 10, 2015, 14 pages.
Sitzmann et al., "DeepVoxels: Learning Persistent 3D Feature Embeddings", Conference on Computer Vision and Pattern Recognition, Jun. 16-Jun. 20, 2019, Long Beach, CA, pp. 2437-2446.
Song et al., "Im2Pano3D: Extrapolating 360 Structure and Semantics Beyond the Field of View", Conference on Computer Vision and Patter Recognition, Jun. 18-Jun. 22, 2018, Salt Lake City, UT, pp. 3847-3856.
Thonat et al., "Multi-View Inpainting for Image-Based Scene Editing and Rendering", 2016 Fourth International Conference on 3D Vision, Oct. 25-28, 2016, Stanford, CA, pp. 351-359.
Tran et al., "A Closer Look at Spatiotemporal Convolutions for Action Recognition", Conference on Computer Vision and Patter Recognition, Jun. 18-Jun. 22, 2018, Salt Lake City, UT, pp. 6450-6459.
Ulyanov et al., "Deep Image Prior", Conference on Computer Vision and Patter Recognition, Jun. 18-Jun. 22, 2018, Salt Lake City, UT, pp. 9446-9454.

(56) References Cited

OTHER PUBLICATIONS

Wang et al., "Image Quality Assessment: From Error Visibility to Structural Similarity", IEEE Transactions on Image Processing, vol. 13, No. 4, Apr. 2004, pp. 600-612.

Wang et al., "Video-to-Video Synthesis", Conference on Neural Information Processing Systems, Dec. 2-8, 2018, Montreal, Canada, 13 pages.

Wexler et al., "Space-Time Completion of Video", IEEE Transactions on Pattern Analysis and Machine Intelligence, vol. 29, No. 3, Mar. 2007, pp. 463-476.

Xia et al., "Gibson Env: Real-World Perception for Embodied Agents", Conference on Computer Vision and Patter Recognition, Jun. 18-Jun. 22, 2018, Salt Lake City, UT, pp. 9068-9079.

Xian et al., "TextureGAN: Controlling Deep Image Synthesis with Texture Patches", Conference on Computer Vision and Patter Recognition, Jun. 18-Jun. 22, 2018, Salt Lake City, UT, pp. 8456-8465.

XU eta l., "Deep Flow-Guided Video Inpainting", Conference on Computer Vision and Pattern Recognition, Jun. 16-Jun. 20, 2019, Long Beach, CA, pp. 3723-3732.

Yan et al., "Learning 6-DOF Grasping Interaction via Deep Geometry-aware 3D Rpresentations", 2018 IEEE International Conference on Robotics and Automation, May 21-25, 2018, Brisbane, Australia, pp. 3766-3773.

Yang et al., "High-Resolution Image Inpainting using Multi-Scale Neural Patch Synthesis", Conference on Computer Vision and Pattern Recognition, Jul. 21-26, 2017, Honolulu HI, pp. 6721-6729.

Yao et al., "3D-Aware Scene Manipulation via Inverse Graphics", Conference on Neural Information Processing Systems, Dec. 2-8, 2018, Montreal, Canada, 12 pages.

Yeh et al., "Semantic Image Inpainting with Deep Generative Models", Conference on Computer Vision and Pattern Recognition, Jul. 21-26, 2017, Honolulu HI, pp. 5485-5493.

Yu et al., "Free-Form Image Inpainting with Gated Convolution", International Conference on Computer Vision, Oct. 27-Nov. 2, 2019, Seoul, Korea, pp. 4471-4480.

Yu et al., "Generative Image Inpainting with Contextual Attention", Conference on Computer Vision and Patter Recognition, Jun. 18-Jun. 22, 2018, Salt Lake City, UT, pp. 5505-5514.

Zhang et al., "An Internal Learning Approach to Video Inpainting", International Conference on Computer Vision, Oct. 27-Nov. 2, 2019, Seoul, Korea, pp. 2720-2729.

Zhang et al., "AutoRemover: Automatic Object Removal for Autonomous Driving Videos", arXiv:1911.12588v1, Nov. 28, 2019, 9 pages.

Zhu et al., "Unpaired Image-to-Image Translation using Cycle-Consistent Adversarial Networks", Conference on Computer Vision and Pattern Recognition, Jul. 21-26, 2017, Honolulu HI, pp. 2223-2232.

\* cited by examiner

SYSTEMS AND METHODS FOR DYNAMIC OBJECT REMOVAL FROM THREE-DIMENSIONAL DATA

RELATED APPLICATION

The present application is based on and claims benefit of U.S. Provisional Patent Application No. 63/035,577 having a filing date of Jun. 5, 2020, which is incorporated by reference herein.

FIELD

The present disclosure relates generally to vehicle perception and testing. In particular, the present disclosure relates to machine-learned model training techniques that can be used with, for example, autonomous vehicles.

BACKGROUND

Robots, including autonomous vehicles, can receive data that is used to perceive an environment through which the robot can travel. Robots can rely on machine-learned models to detect objects within an environment. The effective operation of a robot can depend on accurate object detection provided by the machine-learned models. Various machine-learned training techniques can be applied to improve such object detection.

SUMMARY

Aspects and advantages of embodiments of the present disclosure will be set forth in part in the following description, or may be learned from the description, or may be learned through practice of the embodiments.

As an example, aspects of the present disclosure provide a computing system including one or more processors and one or more computer-readable mediums. The computer-readable mediums store instructions that when executed by the one or more processors cause the computing system to perform operations. The operations include obtaining multi-modal sensor data indicative of a dynamic object within an environment of an autonomous vehicle. The multi-modal sensor data is associated with a plurality of timesteps including a first timestep and a second timestep. The operations include providing the multi-modal sensor data indicative of the dynamic object within the environment as an input to a machine-learned dynamic object removal model. The operations include receiving as an output of the machine-learned dynamic object removal model, in response to receipt of the multi-modal sensor data, a scene representation indicative of at least a portion of the environment including a reconstructed region based at least in part on removal of the dynamic object and multiple levels of granularity.

As another example, aspects of the present disclosure provide an autonomous vehicle including one or more sensors, one or more processors, and one or more computer-readable mediums. The one or more sensors include at least one first sensor and at least one second sensor. The at least one first sensor is a different type of sensor than the at least one second sensor. The one or more computer-readable mediums stores instructions that when executed by the one or more processors cause the autonomous vehicle to perform operations. The operations include obtaining, through the at least one first sensor and the at least one second sensor, multi-modal sensor data indicative of a dynamic object within an environment. The multi-modal sensor data is associated with a plurality of timesteps including a first timestep and a second timestep. The operations include providing the multi-modal sensor data indicative of the dynamic object within the environment as an input to a machine-learned dynamic object removal model. And, the operations include receiving as an output of the machine-learned dynamic object removal model, in response to receipt of the multi-modal sensor data, a scene representation indicative of at least a portion of the environment comprising a reconstructed region based at least in part on removal of the dynamic object and multiple levels of granularity.

As yet another example, aspects of the present disclosure provide a computer-implemented method. The method includes obtaining multi-modal sensor data indicative of a dynamic object within an environment of a robotic platform. The multi-modal sensor data is associated with a plurality of timesteps including a first timestep and a second timestep. The method includes providing the multi-modal sensor data indicative of the dynamic object within the environment as an input to a machine-learned dynamic object removal model. And, the method includes receiving as an output of the machine-learned dynamic object removal model, in response to receipt of the multi-modal sensor data, a scene representation indicative of at least a portion of the environment comprising a reconstructed region based at least in part on removal of the dynamic object and multiple levels of granularity.

Other example aspects of the present disclosure are directed to other systems, methods, vehicles, apparatuses, tangible non-transitory computer-readable media, and devices for generating data (e.g., scene representations, simulation data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
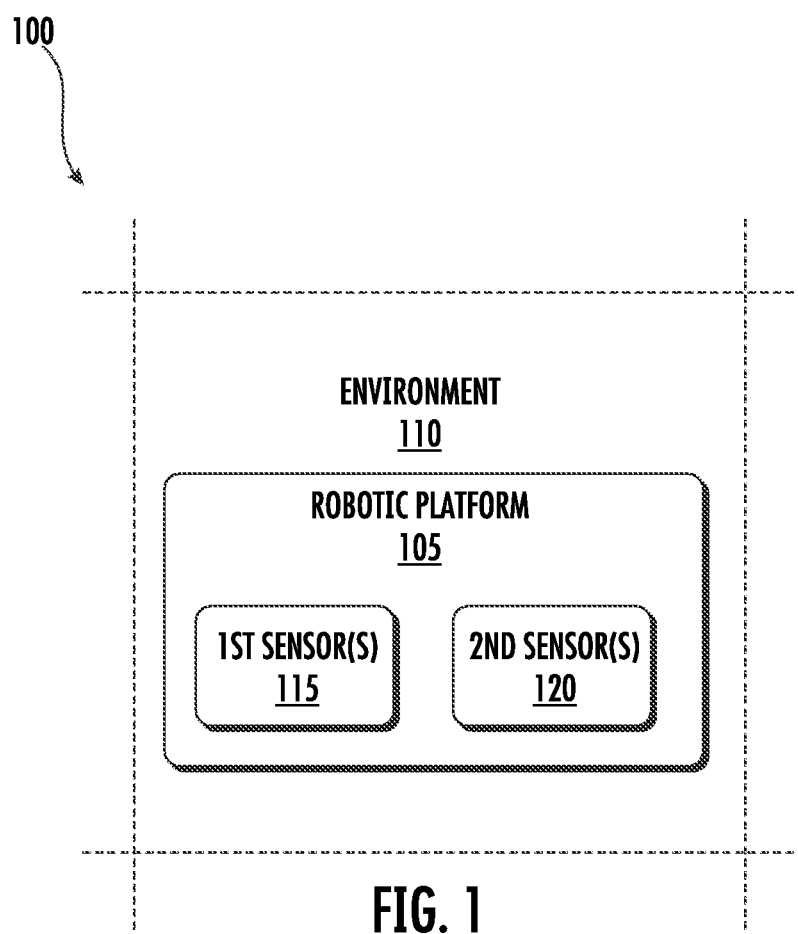
FIG. 1 depicts a block diagram of an example computing platform according to example implementations of the present disclosure.

Aspects of the present disclosure are directed to improved systems and methods for generating data representative of operating environments for robotic platforms such as, for example, by removing dynamic objects from images captured by sensors of a robotic platform. A robotic platform (or one or more sensors thereof) can be configured to obtain multi-modal sensor data indicative of an environment. The robotic platform can include, for example, an autonomous vehicle. The multi-modal sensor data can include three-dimensional image data such as a plurality of images (e.g., captured through camera(s)) supplemented by corresponding depth information (e.g., captured through LIDAR system(s)). The multi-modal sensor data can be used to generate a three-dimensional representation of the environment including the dynamic objects located therein (e.g., vehicles, pedestrians, bicycles, etc. within the environment of the autonomous vehicle). The dynamic objects can occlude static/background features within the three-dimensional representation of the environment. The systems and methods described herein provide an improvement to machine-learning techniques for replacing dynamic objects within the three-dimensional representation of the environment with the previously occluded static/background features. By removing dynamic objects from three-dimensional representations of an environment, the systems and methods described herein can identify previously unidentifiable features of an environment. Moreover, the resulting three-dimensional representations can provide an improvement to testing techniques for autonomous vehicles, machine-learning algorithms, vision systems, etc. by providing a blank slate for the generation and modification of realistic simulation instances descriptive of real world environments.

As described herein, a computing system can obtain multi-modal sensor data indicative of a dynamic object within an environment of a robotic platform. The multi-modal sensor data can include sequential multi-modal sensor data associated with a plurality of timesteps. The computing system can provide the multi-modal sensor data as an input to a machine-learned dynamic object removal model and receive, as an output of the machine-learned dynamic object removal model, a scene representation descriptive of the environment without the dynamic object. To do so, the computing system can be configured to generate a reconstructed region for the scene representation based on the removal of the dynamic object and multiple levels of granularity. The multiple levels of granularity can include a first and second level of granularity. The computing system can leverage information from the first level of granularity (e.g., a coarse-level reconstruction) to generate a scene representation including a reconstructed region of a second level of granularity (e.g., fine-level reconstruction) of a previously occluded area. The second level of granularity can include reduced sensor noise, less shadows, darker textures, and other fine grained details not previously captured by object removal techniques.

Aspects of the present disclosure can provide a number of technical improvements to simulation, robotics, and computer vision technology. The machine-learned dynamic object removal model can leverage multi-modal sensor information (e.g., three-dimensional data, etc.), geometric information (e.g., reference images recorded with different views, depth information associated with the reference images, etc.), temporal information (e.g., previously generated scene representations), and intermediate representations (e.g., coarse-level reconstructions, etc.) to generate highly realistic scene representations using a coarse-to-fine framework. In this manner, the systems and methods of the present disclosure provide an improved approach for removing dynamic objects from a three-dimensional environment, thereby creating improved modifiable templates for creating scenarios especially useful in capturing the diversity in long-tailed distributions of data inherent in robotic testing (e.g., autonomous vehicle testing, etc.).

The systems and methods described herein can accumulate and utilize newly available information such as intermediate multi-modal representations, temporal information, and geometric information to provide practical improvements to simulation, robotic, and vision technology. The intermediate multi-modal representations, for example, can include initial predictions of an image, depth, and semantic layout for a region occluded by a dynamic object. The machine-learned models described herein can learn to generate detailed textures from such information by exploiting spatial contextual and geometry-aware temporal attention modules. As a result, a computing system can remove dynamic objects from sensor data descriptive of unconstrained real-world settings and generate scene representations including fine-grained details such as road markings and textured background structures previously occluded by dynamic objects removed from the scene. This, in turn, improves the functioning of simulation, robotics, and computer vision technologies by increasing the accuracy of simulated environments. This also provides the basis for a blank, yet-realistic, simulation scene to which dynamic object(s) can be added. As a result, the systems, methods, and models described herein allow for efficient and consistent simulation scene creation that can be varied for evaluation across a multitude of circumstances (e.g., with a variety of dynamic object types and positions, etc.). This provides an improved approach for simulating the operation of robotic platforms. In addition, the systems and methods described herein, reduce memory usage and increase processing speeds for generating simulated environments from real-world data by reducing the number reference frames needed to realistically inpaint occluded regions within a three-dimensional environment. Ultimately, the techniques disclosed herein result in more accurate and robust simulation data; thereby improving simulation training techniques for a vast array of robotic, vision, or autonomous vehicle technologies.

The following describes the technology of this disclosure within the context of an autonomous vehicle for example purposes only. As described herein, the technology described herein is not limited to an autonomous vehicle and can be implemented within other robotic and computing systems.

With reference now to FIGS. 1-10, example embodiments of the present disclosure will be discussed in further detail. FIG. 1 depicts a block diagram of an example operational scenario 100 according to example implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The robotic platform 105 can include one or more sensor(s) 115, 120. The one or more sensors 115, 120 can be configured to generate or store data descriptive of the environment 110 (e.g., one or more static or dynamic objects therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The robotic platform 105 can include any type of platform configured to operate with the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
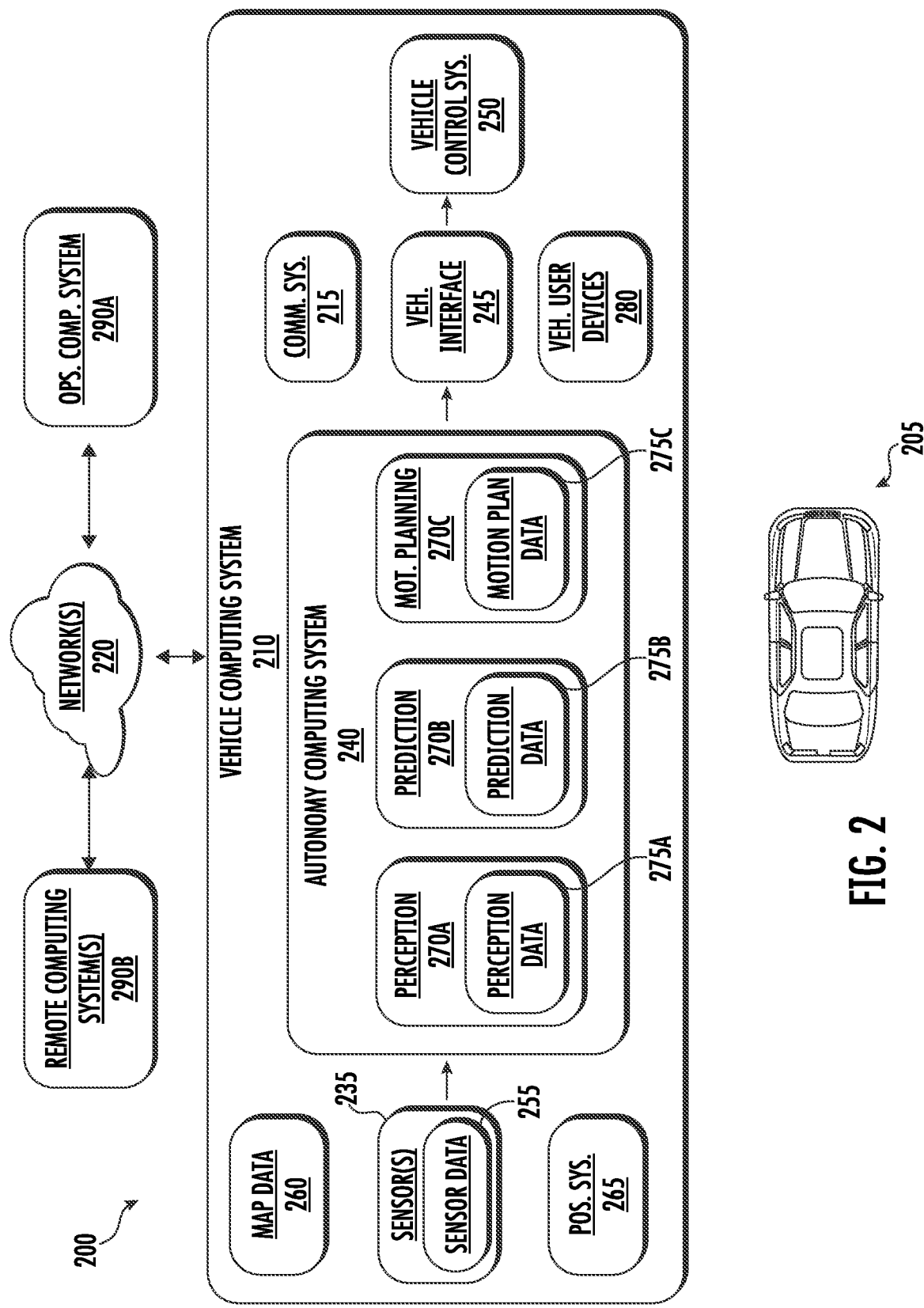
FIG. 2 depicts a block diagram of an example system according to example implementations of the present disclosure.

FIG. 2 depicts an example system overview 200 of the robotic platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 210. Generally, the vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 200 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the communications network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the communications network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting training data, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain multi-modal sensor data indicative of one or more static or dynamic objects within an environment of the autonomous vehicle 205. As described herein with reference to the remaining figures, the multi-modal sensor data can be provided to the operational computing system 290A for use in generating scene representations without the dynamic objects, simulation data for robotic platform testing, or training one or more machine-learned models of the vehicle computing system 210.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 235 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction system 275B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning system 270C-280 can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include sequential multi-modal sensor data indicative of a plurality of environments at different time steps. In some implementations, the training data can include a plurality of environments previously recorded by the autonomous vehicle with dynamic objects removed.

To help improve the performance of a robotic platform, such as an autonomous vehicle of FIG. 2, the technology of present disclosure can leverage three dimensional scene representations of a surrounding environment. Using the technology of the present disclosure, dynamic object(s) can be removed from the scene representation and the regions associated with such removal can be reconstructed to represent the static background that may have previously been occluded by such objects.

Figure 3:
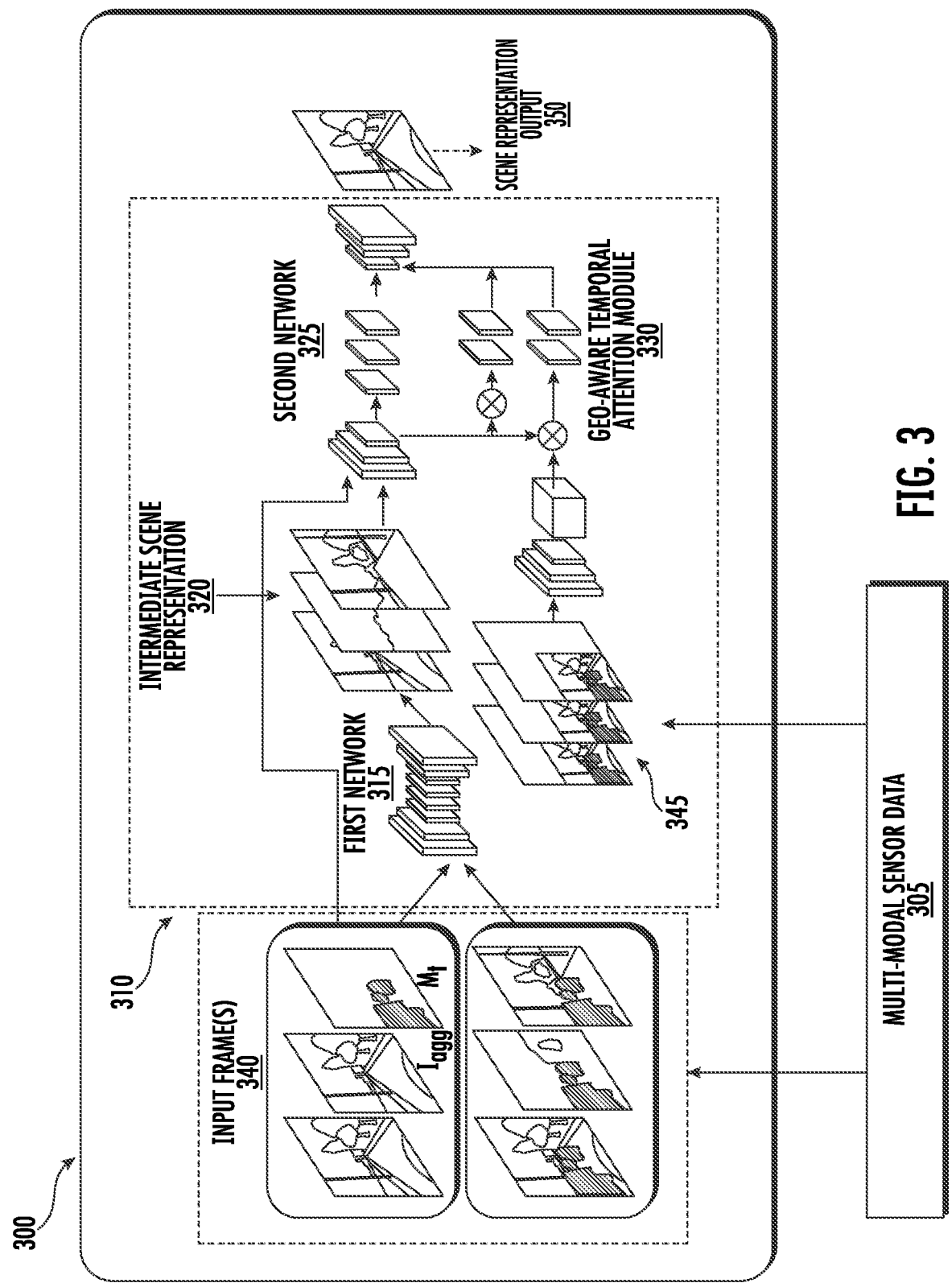
FIG. 3 depicts an example machine-learned dynamic object removal model according to example implementations of the present disclosure.

For example, FIG. 3 depicts an example system 300 configured to generate a scene representation according to example implementations of the present disclosure. As further described herein, the scene representation can be indicative of at least a portion of an environment in which a robotic platform operates. The system 300 can include any of the system(s) (e.g., robotic platform 105, autonomous vehicle 205, vehicle computing system 210, remote computing system 290B, operations computing system 290A, etc.) described herein such as, for example, with reference to FIGS. 1, 2 etc. The system 300 can be configured to remove dynamic objects from sequential multi-modal sensor data to provide a basis for simulation data or otherwise identify previously occluded regions within a three-dimensional environment.

To do so, the system 300 can obtain sensor data 305. In some implementations, the sensor data 305 can include multi-modal sensor data that is indicative of at least one dynamic object within at least one environment of a computing system such as, for example, the system 300, an autonomous vehicle (e.g., vehicle 205), a robotic platform (e.g., platform 105), or any other system (or combination thereof) configured to obtain sensor information associated with a real world environment.

The multi-modal sensor data 305 can include image data, depth data, processed image/depth data, or any other data associated with one or more real world environments. For example, the multi-modal sensor data 305 can include image data depicting at least one real world environment. The image data can include a plurality of image frames depicting the at least one environment from different perspective(s). By way of example, the image data can include a plurality of image frames captured through one or more image capturing devices. In some implementations, each of the plurality of image frames can be associated with a respective viewpoint based, at least in part, on a respective orientation of a corresponding image capturing device. In addition, or alternatively, the multi-modal sensor data 305 can include depth data. The depth data can include positional information for one or more objects (e.g., static, background, dynamic, etc.) within a field of view of one or more sensors (e.g., LiDAR sensors, RADAR sensors, etc.). For example, the depth data can include a three-dimensional point cloud (e.g., a LiDAR point cloud, etc.) indicative of a relative position of the one or more features within an environment. In some implementations, the image data and the depth data can be fused to generate a three-dimensional representation (e.g., three-dimensional pixels, etc.) of an environment.

In some implementations, the system 300 can generate the multi-modal sensor data 305. For example, the system 300 can obtain, through one or more first sensors (e.g., sensor(s) 115) or one or more second sensors (e.g., sensor(s) 120) of a different type, sensor data indicative of at least one dynamic object within at least one environment. By way of example, at least one of the first sensor or the second sensor can include an image capturing device. The sensor data can include a plurality of image frames captured by the image capturing device. As an example, the plurality of image frames can include a plurality of red, green, and blue ("RGB") camera images. The camera images, for example, can be captured by multiple RGB cameras (e.g., first sensor(s) 115, etc.). The multiple cameras, for example, can be mounted to a robotic platform (e.g., robotic platform 105). In some implementations, the plurality of image frames can include a subset of RGB images depicting a plurality of camera perspectives of a respective scene over a plurality of time steps (e.g., a first timestep, a second time step, etc.).

In addition, or alternatively, at least one of the first sensor or the second sensor can include a depth capturing device and the sensor data can include depth information. As an example, the depth information can include a plurality of sparse light detection and ranging ("LiDAR") point clouds. The sparse LiDAR point cloud(s), for example, can be captured by multiple LiDAR sensors (e.g., second sensor(s) 120, etc.). The multiple LiDAR sensors, for example, can be mounted to a robotic platform (e.g., robotic platform 105). In some implementations, at least one of the sparse LiDAR point cloud(s) can be associated with a respective scene at one or more time steps.

The system 300 can generate (or receive) the multi-modal sensor data 305 based at least in part on the sensor data (e.g., from the first sensor(s) 115 and the second sensor(s) 120, etc.). The multi-modal sensor data 305, for example, can include a three-dimensional reconstruction of at least a portion of an environment with the dynamic object. By way of example, the multi-modal sensor data 305 can be generated by fusing (e.g., by one or more fusing techniques) LiDAR points for a respective scene to one or more camera images (e.g., pixels thereof) corresponding to the scene. In this manner, the multi-modal sensor data 305 can include a plurality of red, green, blue, depth ("RGBD") images.

In some implementations, the multi-modal sensor data 305 can be associated with a plurality of timesteps such as, for example, a first timestep, a second timestep, etc. The first timestep can be a given timestep (e.g., used as a basis for analysis) and a second timestep can be a previous timestep. For example, the multi-modal sensor data 305 can include a sequence of RGBD images over time. Each RGBD image of the sequence of RGBD images can be associated with an image, depth information for the image (or one or more pixels thereof), a respective time, or one or more camera views. In some implementations, the system 300 can be configured to remove dynamic objects from one or more RGBD images associated with a first sensor view (e.g., a center camera view, etc.) at a first time step while using additional RGBD images (e.g., one or more reference frames) associated with one or more secondary sensor views or second time steps (e.g., a previous timestep, etc.) as references.

The system 300 can provide the multi-modal sensor data 305 indicative of the dynamic object within an environment (e.g., depicted by a target frame) as an input to a machine-learned dynamic object removal model 310. For example, the system 300 can include or have access to the machine-learned dynamic object removal model 310. The machine-learned dynamic object removal model 310 (or a portion thereof) can be stored in one or more memories of the system 300. In addition, or alternatively, the machine-learned dynamic object removal model 310 (or a portion thereof) can be stored on one or more additional devices communicatively coupled to the system 300.

The system 300 can receive as an output of the machine-learned dynamic object removal model 300, in response to receipt of the multi-modal sensor data 305, a scene representation 350 indicative of at least a portion of the environment (e.g., depicted by the target frame) including a reconstructed region (e.g., a previously occluded region) based at least in part on removal of the dynamic object and multiple levels of granularity. For example, the machine-learned dynamic object removal model 310 can be configured to inpaint one or more pixels of a region that is occluded by the dynamic object (e.g., in the target frame) by referencing one or more reference frames (e.g., of the multi-modal sensor data 305) where the occluded region is visible (e.g., due to a different view perspective, a different time, etc.). In this manner, the reconstructed region can include a static background previously occluded by the dynamic object previously depicted by the target frame. In addition, or alternatively, the reconstructed region can reduce one or more lighting effects of the dynamic object. By way of example, the reconstructed region can reduce one or more shadows (or shading effects) associated with the dynamic object.

The machine-learned object removal model 310 can include a plurality of networks configured to generate one or more phases of the scene representation 350. By way of example, the machine-learned object removal model 310 can include a first network 315 configured to generate an intermediate scene representation 320 and a second network 325 configured to generate the scene representation 350 based, at least in part, on the intermediate scene representation 320 and the multi-modal sensor data 305.

The first network 315 and the second network 325 can include any type or number of machine-learned models. As examples, the first network 315 and second network 325 can be or can otherwise include various machine-learned models such as, for example, inpainting networks, neural networks (e.g., deep neural networks), support vector machines, decision trees, ensemble models, k-nearest neighbors models, Bayesian networks, generative adversarial networks, or other types of models including linear models or non-linear models. Example neural networks include feed-forward neural networks, recurrent neural networks (e.g., long short-term memory recurrent neural networks), convolutional neural networks, or other forms of neural networks. In some implementations, the first network 315 can include a course network that learns to make initial predictions of an image, depth, and semantic layout of an occluded region and the second network 325 can include a geometry-aware inpainting network that learns to generate detailed textures from predictions by exploiting spatial contextual and geometry-aware temporal attention modules. The first network 315 and the second network 325 of the machine-learned dynamic object removal model 310 can be previously trained using one or more machine-learning techniques (e.g., backpropagation of errors, generative-adversarial training techniques, etc.).

In some implementations, the first network 315 and the second network 325 can be trained end-to-end. For example, the machine-learned dynamic object removal model 310 (e.g., the first network 315, second network 325) can be previously trained using a loss function including a plurality of loss terms. The plurality of loss terms can include at least a first loss term associated with reconstruction at a first level of granularity (e.g., a coarse-level reconstruction) associated with the first network 315 or a second loss term associated with reconstruction at a second level of granularity (e.g., the fine-level reconstruction) associated with the second network 325. In this manner, the machine-learned dynamic object removal model 310 can be trained based, at least in part, on outputs of the first network 315 or the second network 325.

The machine-learned object removal model 310 can generate (e.g., through the first network 315) the intermediate scene representation 320 based at least in part on the multi-modal sensor data 305. The intermediate scene representation 320 can be indicative of at least a portion of the environment including a target region based at least in part on the removal of the dynamic object. The target region can be a region within the sensor data associated with the dynamic object. For example, the target region can have a shape or boundaries that match an outline of the dynamic object in the target frame at a given timestep (e.g., as provided through a binary mask, semantic analysis, etc.). The target region can have a first level of granularity. The first level of granularity can be associated with a coarse-level reconstruction. The coarse-level reconstruction, for example, can include a first prediction of the static or background area occluded by the dynamic object.

The target region having the first level of granularity can be characterized by at least one of (i) an image prediction parameter, (ii) a depth prediction parameter, or (iii) a semantic layout parameter associated with the target region. The image prediction parameter, for example, can include a pixel-wise prediction for a static area occluded by the dynamic object in the target region. The depth prediction parameter can include a depth map prediction for the static area occluded by the dynamic object in the target region. The semantic layout parameter can include a semantic segmentation prediction for the static area occluded by the dynamic object in the target region. In this manner, the intermediate scene representation 320 can provide a rough prediction (e.g., pixel-wise prediction) for a static area in addition to geometric and semantic data corresponding to the area.

The machine-learned object removal model 310 can generate (e.g., through the second network 325) the scene representation 350 based at least in part on the multi-modal sensor data 305 and the intermediate scene representation 320. The scene representation 350 can be indicative of the reconstructed region having a second level of granularity. The second level of granularity can be associated with a fine-level reconstruction. For example, the reconstructed region having the second level of granularity can be characterized by at least one of (i) a per-pixel reconstruction or (ii) a feature-level reconstruction. The per-pixel reconstruction, for example, can capture fine grain details within a static area not represented by the intermediate representation. In addition, or alternatively, the feature-level reconstruction can remove shading effects and reduce sensor noise from the intermediate representation.

Figure 4A:
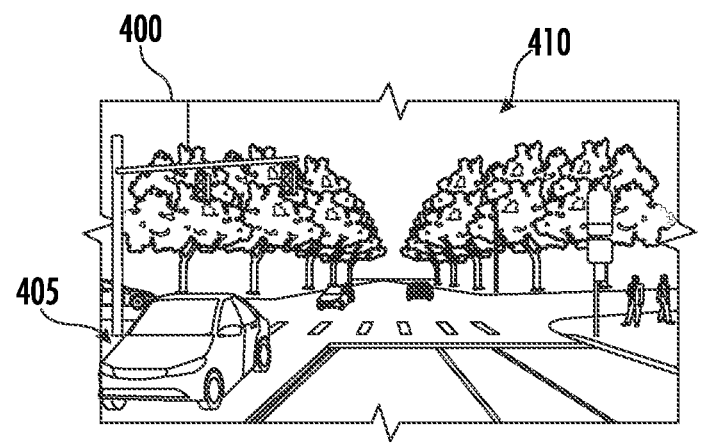
FIGS. 4A-4C depict example scenes according to example implementations of the present disclosure.
Figure 4B:
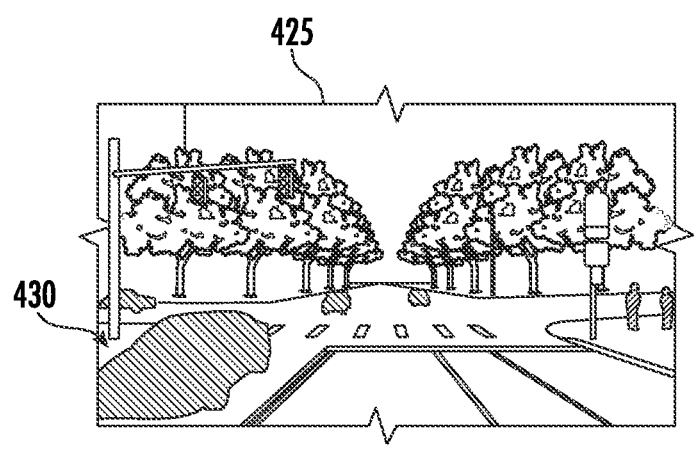
Figure 4C:
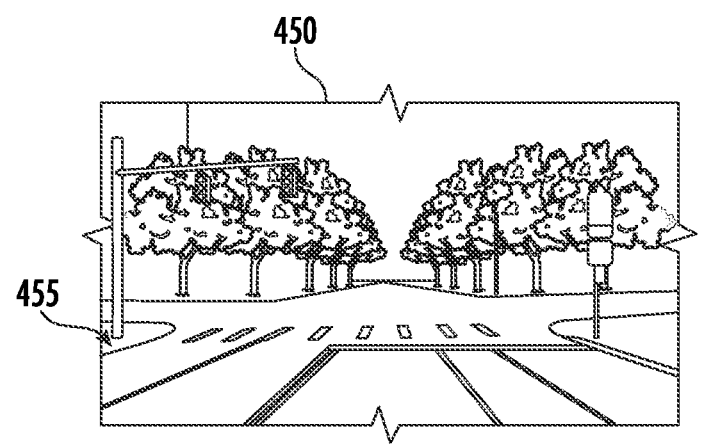
Figure 5:
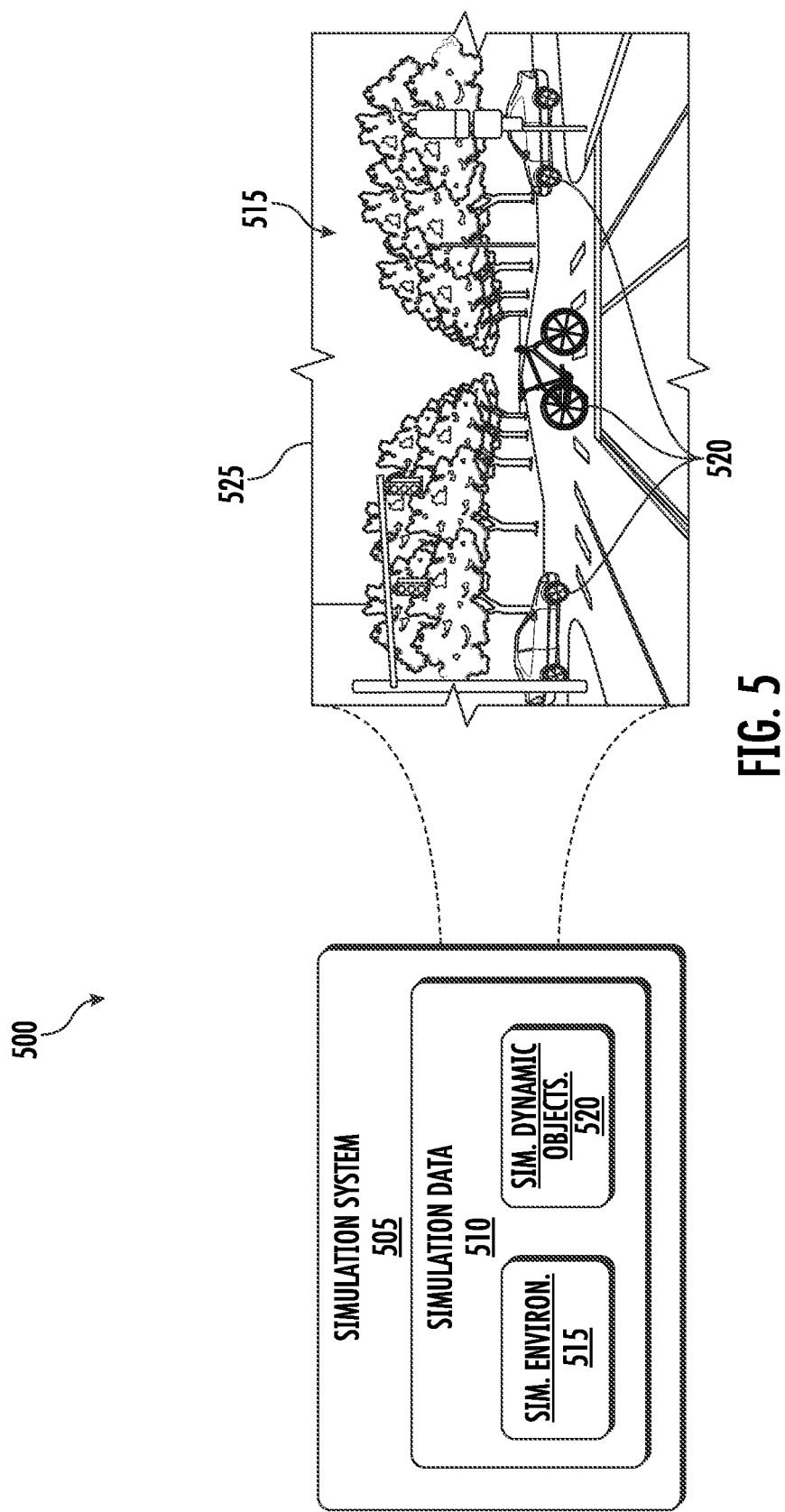
FIG. 5 depicts an example simulation ecosystem according to example implementations of the present disclosure.

By way of example, FIGS. 4A-4C depict example scenes 400, 425, 450 according to example implementations of the present disclosure. FIG. 4A, for example, depicts a scene 400 as represented by a target image. The scene 400 includes a plurality of dynamic objects occluding one or more region(s) of the depicted environment 410. This includes, for example, dynamic object 405 (e.g., a vehicle within the surrounding environment). FIG. 4B depicts an intermediate scene representation 425 for the target image. The intermediate scene representation 425 removes at least one dynamic object (e.g., dynamic object 405) from the environment 410 and replaces the one or more occluded regions of the depicted environment 410 with one or more coarse representations 430 of a predicted static environment within the occluded region(s). The coarse representations 430 can include pixel, depth, and semantic information for each respective region. FIG. 4C depicts a scene representation 450 with a reconstructed region 455 having a second level of granularity. The scene representation 450 can replace the one or more coarse representation(s) 430 of the environment 410 with one or more reconstructed region(s) 455 having a fine-level of granularity. The reconstructed region(s) 455 can capture fine grained details and reduce adverse shading effects and sensor noise from the intermediate representations 425.

Turning back to FIG. 3, example end-to-end operations of the machine-learned dynamic object removal model will be discussed in more detail.

The multi-modal sensor data 305 can include one or more input frames 340. For example, the multi-modal sensor data 305 can include a plurality of image sequences. Each sequence can include a target image frame and a plurality of reference image frames (e.g., at one or more different times or perspectives than the target image frame). The plurality of reference image frames, for example, can be determined based on one or more target areas (e.g., occluded by one or more dynamic objects within the target image frame) of the target image frame. In some implementations, each of the image frames can be associated with one or more depth maps, semantic layouts (e.g., outlining/labeling objects within an image) or binary masks (e.g., masking one or more areas of an image occupied by an object). A semantic layout, for example, can outline or label one or more object(s) within an environment depicted by an image. As another example, a binary mask can indicate regions (e.g., outlined by the semantic layout) occupied by the one or more object(s) within the environment depicted by an image.

By way of example, a sequence (e.g., of RGBD images) can include a plurality of image frames (e.g., denoted as N) and a plurality of different views (e.g., denoted as K). The i-th RGBD camera image (e.g., three-dimensional image) of the k-th time step can be denoted as $I_{k,i}$, a corresponding depth (e.g., depth map) for the image can be denoted as $D_{k,i}$, a semantic layout (e.g., outlining one or object(s) within the image) for the image can be denoted as $S_{k,i}$, and a binary mask (e.g., masking one or more areas of an image occupied by an object) for the image can be denoted as $M_{k,i}$.

In some implementation, the multi-modal sensor data 305 can include or be processed to generate the one or more input frame(s) 340 for a target image. For example, the one or more input frame(s) 340 can include at least one of: (i) a binary mask for the target image (e.g., denoted $M_t$) indicating a plurality of pixels of the target image to be inpainted, (ii) the target image with the at least one dynamic object masked (e.g., denoted $I_t \odot (1-M_t)$), (iii) an estimated depth map (e.g., denoted $D_t \odot (1-M_t)$) for the target image, a semantic segmentation (e.g., denoted $S_t \odot (1-M_t)$) for the target image, or (iv) an aggregated image based on each of a plurality of reference frames (e.g., denoted P) of the multi-modal sensor data 305 (e.g., denoted $I_{agg}$=agg $(\{I_s\}_{s \in P})$).

The reference frames (e.g., P), for example, can include a subset of the plurality of frames associated with the target frame. The reference frames, for example, can include a set of candidate frames from which to sample the reprojected images. In some implementations, the system 300 can select a subset of image frames (e.g., reference frames) from the plurality of frames based at least in part on a comparison of pixels centered around an area (e.g., the target area) associated with the reconstructed region across the subset of image frames. For example, the system 300 can apply a view selection algorithm to select the set of reference frames (e.g., P). The selection algorithm can select the reference frames (e.g., P) according to a heuristic, |P|<<N×K, that prefers reference images which reveal unseen regions of the target image that other source images do not reveal. By way of example, the selection algorithm can include:

| Algorithm 1 View Selection |
| --- |
| 1: procedure SELECT(target frame t) |
| 2:  $\vec{c} = \vec{0}$ is the number of times each pixel in $I_s$ is visible in some reference frame. |
| 3:  $\mathcal{P} = \emptyset$ |
| 4:  while $|\mathcal{P}|$ < the desired number of reference views do |
| 5:   $\vec{\beta} \leftarrow (\vec{c} + \epsilon)^{-1}$ |
| 6:   $j^* \leftarrow \text{argmax}_{j \notin \mathcal{P}} \vec{\beta}^T M_{j \rightarrow t}$ |
| 7:   $\mathcal{P} \leftarrow \mathcal{P} \cup \{j^*\}$ |
| 8:   $\vec{c} \leftarrow \vec{c} + M_{j^* \rightarrow t}$ |
| 9:  end while |
| 10: return $\mathcal{P}$ |
| 11: end procedure |

The aggregated image can be determined by applying an aggregation operation to the subset of frames. The aggregation operation can determine an average pixel value for one or more pixels of the reference and target frames. The aggregated image can be indicative of the average pixel value for the one or more pixels of the reference and target frames. In addition, or alternatively, the aggregation operation can determine a median pixel value for the one or more pixels. In such a case, the aggregated image can be indicative of the median pixel value for the one or more pixels.

The input frame(s) 340 can be input to the machine-learned object removal model 310 (e.g., the first (e.g., coarse) network 315) to receive the intermediate scene representation 320 (e.g., denoted as $F_t$). The intermediate scene representation 320 can include a predicted multi-modal representation $F_t = [I_t^{(1)}, D_t^{(1)}, S_t^{(1)}]$. For example, the intermediate scene representation 320 can include an image prediction parameter, $I_t^{(1)}$, including a predicted inpainting of the static area occluded by the dynamic object. The intermediate scene representation 320 can include a depth prediction parameter, $D_t^{(1)}$, including a predicted depth map for the static area occluded by the dynamic object. In some implementations, the intermediate scene representation 320 can include a semantic layout parameter $S_t^{(1)}$, including a predicted semantic representation for the static area occluded by the dynamic object.

The intermediate scene representation 320 (e.g., $F_t$), the binary mask $M_t$, the aggregated image $I_{agg}$ from the reference frames, or the reprojected images $\{I_s\}_{s \in P}$ from the corresponding reference frames can be input to the machine-learned object removal model 310 (e.g., the second (e.g., refinement) network 325). The machine-learned object removal model 310 (e.g., the second (e.g., refinement) network 325) can synthesize a scene representation (e.g., denoted $I_t^{(2)}$) of the target image containing no dynamic objects based on the inputs. In this manner, the intermediate scene representation 320 (e.g., $F_t$) can serve as an intermediate step containing semantic information (e.g., semantic layout parameter indicative $S_t^{(1)}$) or geometry information (e.g., depth prediction parameter, $D_t^{(1)}$ for fine grained dynamic object removal.

In some implementations, the machine-learned object removal model 310 (e.g., the second (e.g., refinement) network 325) can include or be associated with a geometry-aware temporal attention module 330. The geometry-aware temporal attention module 330 can copy or borrow features from visible regions in reference frames (e.g., P) to the target regions (e.g., occluded regions) to be inpainted. To do so, the machine-learned object removal model 310 (e.g., the geometry-aware temporal attention module 330, etc.) can determine one or more feature similarities from the plurality of frames based at least in part on a comparison of pixels centered around the target area. For instance, the machine-learned object removal model 310 (e.g., the geometry-aware temporal attention module 330, etc.) can determine one or more feature similarities between pixels to be inpainted and the spatial-temporal tube on the reprojected images 345 centered around the corresponding pixels.

By way of example, the machine-learned object removal model 310 (e.g., the geometry-aware temporal attention module 330, etc.) can generate (e.g., encode, etc.) a query feature map $f_t$ for the second network 325 based, at least in part, on the target image $I_t$, its depth $D_t$, semantic segmentation $S_t$, and the binary mask $M_t$. In addition, or alternatively, the machine-learned object removal model 310 (e.g., the geometry-aware temporal attention module 330, etc.) can generate a key feature map $f_s$ for each image $I_s$ and binary mask $M_s$ of the reference images (e.g., where s∈P) based, at least in part, on the respective image $I_s$, its depth $D_s$, semantic segmentation $S_s$, and binary mask $M_s$.

The machine-learned object removal model 310 (e.g., the geometry-aware temporal attention module 330, etc.) can obtain a query feature $f_t(u)$ of the query feature map centered at u in the target image and at least one key feature $f_s(v)$ from the one or more key feature maps centered at v in the spatial neighborhood (e.g., a 3×3 window) of u (v∈N(v)) and output a feature map $f_t^*$ based on a weighted average of the key feature maps, adjusted by one or more attention weights. The one or more attention weights (e.g., denoted α), for example, can include a dot product between two features followed by a softmax operation. Output feature maps from a spatial attention module (e.g., a machine-learned module configured to attend feature patches within a single frame) can be merged with outputs from the geometry-aware temporal attention module 330 for decoding:

$$f_t^*(u) = \sum\nolimits_{v \in N(u) \text{ and } s \in P} \alpha f_s(v) \text{ where } \alpha = \frac{\exp(f_t(u), f_s(v))}{\sum_{w \in N(u)} \exp\langle f_t(u), f_s(w) \rangle}.$$

In this manner, the machine-learned object removal model 310 (e.g., the geometry-aware temporal attention module 330, etc.) can utilize a minimal number of candidate patches during training and can dynamically scale to make use of more or fewer views depending on computational resources. At inference time, the machine-learned object removal model 310 (e.g., the geometry-aware temporal attention module 330, etc.) can use a greater number of reference frames (e.g., |P|=48) than previous techniques.

In some implementations, the machine-learned object removal model 310 can obtain one or more temporal feedback inputs to improve perceptual consistency over one or more timesteps. For example, the machine-learned object removal model 310 (e.g., the second (e.g., refinement) network 325) can be configured to generate a scene representation for one or more temporally consecutive frames. In such a case, the machine-learned object removal model 310 can generate a scene representation for a target image at a first timestep (e.g., a given timestep) based, at least in part, on data (e.g., multi-modal sensor data 305, intermediate representations, etc.) associated with one or more scene representations determined at a second timestep (e.g., a previous timestep). In this manner, the machine-learned object removal model 310 can leverage previously determined information to improve perceptual consistency over one or more timesteps (e.g., one or more points in time). By way of example, for consecutive times such as the first, given, timestep (e.g., denoted i') and the second, previous, timestep (e.g., denoted i), the predicted output $I_{1,i}$ at the previous frame i can be reprojected to $I_{(1,i) \to (1,i')}$ and passed back into the machine-learned object removal model 310 for inpainting the given frame at the first i'-th timestep. The temporal feedback can be built into the machine-learned object removal model 310 and trained end-to-end. In this manner, the temporal feedback can suppress artifacts including flickering and temporal inconsistencies with output.

The system 300 (e.g., machine-learned object removal model 310) can generate a plurality of scene representations based, at least in part, on the plurality of image frames of the sequential multi-modal sensor data 305. The plurality of scene representations can depict a plurality of three-dimensional static environments without dynamic objects. In some implementations, the plurality of three-dimensional static environments can represent one or more environments (e.g., within which a robotic platform 105 operates) with dynamic objects removed. The system 300 can utilize the plurality of scene representations in real-time (e.g., while online for one or more perception, prediction, or motion planning functions. For example, by understanding the contents/features within occluded region(s) of a sensor field of view, an autonomous vehicle can better plan its motion through its environment by generating motion trajectories that account for the occluded features within those regions.

In addition, or alternatively, the system 300 can utilize the plurality of scene representations to simulate one or more recorded environments. For example, FIG. 5A depicts an example simulation ecosystem 500 according to example implementations of the present disclosure. The simulation ecosystem 500 can include a simulation system 505 and simulation data 510. The simulation data 510 can include one or more simulated environments 515 or one or more simulated dynamic objects 520. The simulation system 505 can generate one or more simulation instances 525 based, at least in part, on the simulated environment(s) 515 or simulated dynamic object(s) 520. For example, a simulation instance 525 can include at least one simulated dynamic object 520 rendered within a simulated environment 515.

In some implementations, the simulation system 505 can generate the simulation data 510 based at least in part on the scene representation (e.g., scene representation 350, 450, etc.) including the reconstructed region. The simulation data 510, for example, can include simulated environment(s) 515 based, at least in part, on the scene representation. To generate a simulated environment 515 based at least in part on the scene representation, the simulation data 510 can utilize the information encoded in the scene representation as outputted from the machine-learned dynamic object removal model or a processed version thereof. For instance, a scene representation (with the dynamic object(s) removed) can encode position data indicative of the position of objects within the surrounding environment. The positions of the objects can be defined relative to one or more reference points, relative to one another, defined within a reference frame (e.g., coordinates, etc.), or otherwise described to allow the simulation system 505 to process data indicative of the scene representation to identify the positions of the objects. The simulation system 505 can generate the simulated environment 515 based on the position data such that the static background of the simulated environment 515 is reflective of the scene representation at the given timestep. For instance, a sidewalk, trees, traffic signals, traffic signs, lane markings, etc. of the scene representation can appear in the same relative position within the simulated environment 515 that is generated from the scene representation. As described herein, this can allow for more realistic and configurable simulation templates, in which dynamic objects can be simulated for robotic platform testing.

In addition, or alternatively, the simulation data can include simulated dynamic object(s) 520 designed to interact (e.g., move, change positions, etc.) within the simulated scene. A simulated dynamic object 520 can include a dynamic object that is configured (e.g., programmed, etc.) to move within the simulated environment 515 and was not a dynamic object that was in the scene representation from which the simulated environment 515 was created. A simulated dynamic object 520 can be defined by parameters such as, for example, object type, size, shape, color, starting position at simulation initiation, motion trajectory, ending position, goal(s), attentiveness, reaction ability, or other factors. A simulated dynamic object 520 and its associated parameter(s) can be selected by a human user or automatically generated by the simulation system 505.

The simulation data 510 can be associated with simulating the operation of an autonomous vehicle (e.g., robotic platform 105, autonomous vehicle 205, etc.). For example, a simulation instance 525 can include a simulated environment 515 that is based at least in part on the scene representation and includes one or more simulated dynamic objects 520. The simulated dynamic object(s) 520 can include simulated object(s) added (e.g., rendered within, etc.) to the simulated environment 515. The simulated dynamic object(s) 520 can include one or more roadway objects such as, for example, one or more vehicles, bicycles, debris, animals, pedestrians, or any other object associated with a roadway.

The dynamic object(s) 520 can be designed (e.g., through one or more preset rules, dynamic control signals, etc.) to interact within the simulated environment 515. In this manner, a scene representation with the reconstructed region can provide static background data for a simulated environment 515 for simulating the operation of an autonomous vehicle with one or more simulated dynamic objects 520. By way of example, the scene representation can include data describing the locations of the static objects/backgrounds within an environment. The simulated environment 515 can be generated based, at least in part, on the locations of the static objects, for example, to generate the static background/objects (e.g., sidewalks, roads, streetlights, trees, etc.) within the simulated environment 515. The simulated environment 515 can be supplemented with one or more of the simulated dynamic object(s) 520 to generate an interactive simulation instance 525 for autonomous vehicle testing, etc. In this manner, the scene representation can be used in a simulation as a blank slate for adding virtual dynamic objects and creating scenarios that capture diversity in the long-tailed distribution of driving data.

Figure 6:
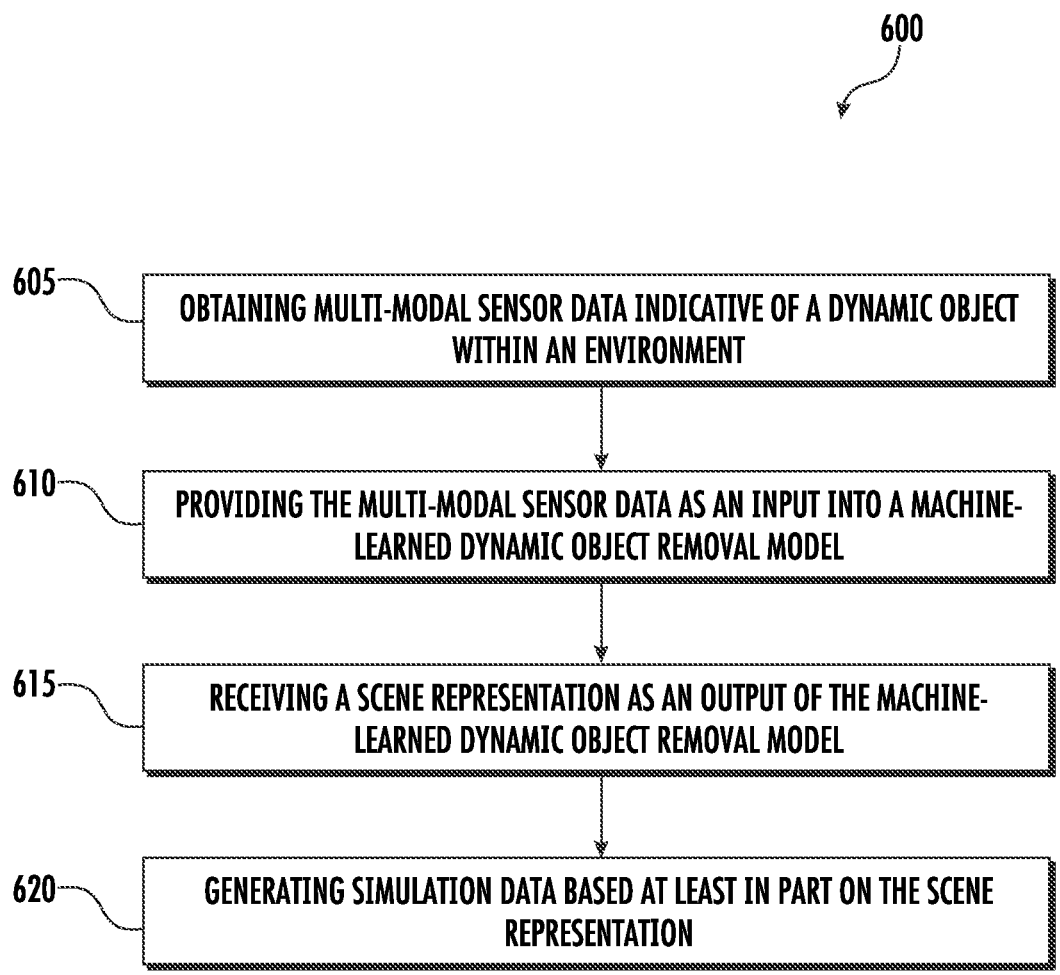
FIG. 6 depicts a flowchart of an example method for generating scene representations and simulation data according to aspects of the present disclosure.

FIG. 6 depicts a flowchart of a method 600 for generating scene representations without dynamic object(s) and, in some implementations, simulation data according to aspects of the present disclosure. One or more portion(s) of the method 600 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, simulation system 505, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3, 5, 10, etc.), for example, to generate simulation data. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 605, the method 600 can include obtaining multi-modal sensor data indicative of a dynamic object within an environment. For example, a computing system (e.g., robotic platform 105, vehicle computing system 210, operations computing system(s) 290A, remote computing system(s) 290B, system 300, simulation system 505, etc.) can obtain the multi-modal sensor data indicative of the dynamic object within the environment.

At 610, the method 600 can include providing the multi-modal sensor data as an input into a machine-learned dynamic object removal model. For example, the computing system can provide the multi-modal sensor data as the input into the machine-learned dynamic object removal model.

At 615, the method 600 can include receiving a scene representation as an output of the machine-learned dynamic object removal model. For example, the computing system can receive the scene representation as the output of the machine-learned dynamic object removal model.

At 620, the method 600 can include generating simulation data based at least in part on the scene representation. For example, the computing system can generate the simulation data based at least in part on the scene representation, as described herein.

Figure 7:
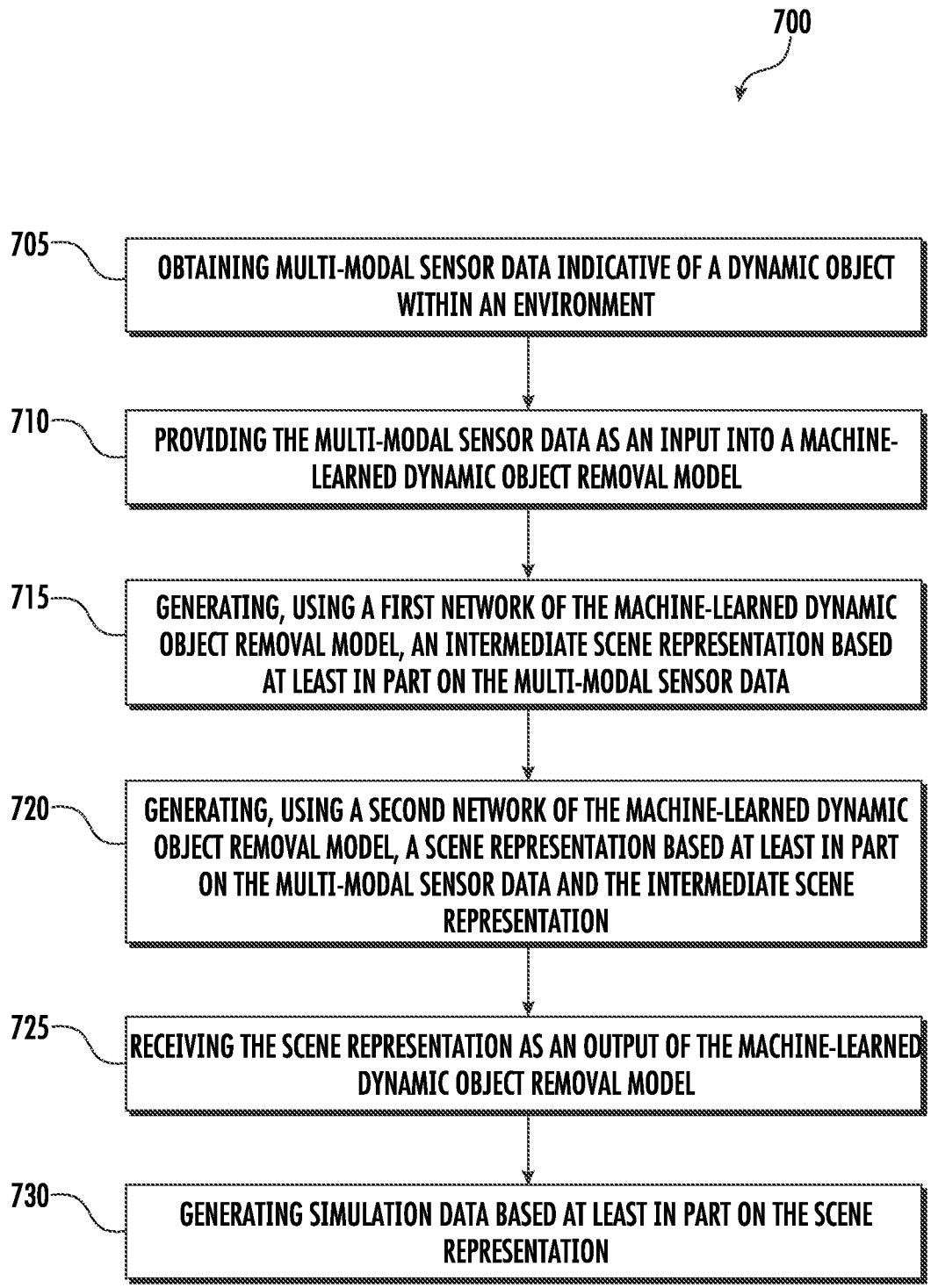
FIG. 7 depicts another flowchart of an example method for generating scene representations and simulation data according to aspects of the present disclosure.

FIG. 7 depicts another flowchart of a method 700 for generating scene representations without dynamic object(s) and, in some implementations, simulation data according to aspects of the present disclosure. One or more portion(s) of the method 700 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, simulation system 505, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 5, 10, etc.), for example, to generate simulation data. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the method 700 can include obtaining multi-modal sensor data indicative of a dynamic object within an environment. For example, a computing system (e.g., robotic platform 105, vehicle computing system 210, operations computing system(s) 290A, remote computing system(s) 290B, system 300, simulation system 505, etc.) can obtain the multi-modal sensor data indicative of the dynamic object within the environment.

At 710, the method 700 can include providing the multi-modal sensor data as an input into a machine-learned dynamic object removal model. For example, the computing system can provide the multi-modal sensor data as the input into the machine-learned dynamic object removal model.

At 715, the method 700 can include generating, using a first network of the machine-learned dynamic object removal model, an intermediate scene representation based at least in part on the multi-modal sensor data. For example, the computing system can generate, using the first network of the machine-learned dynamic object removal model, the intermediate scene representation based at least in part on the multi-modal sensor data. As described herein, the intermediate scene representation can include target regions associated with a removed dynamic object. The first network can apply a first level of granularity (e.g., a coarse level) when reconstructing the target region.

At 720, the method 700 can include generating, using a second network of the machine-learned dynamic object removal model, a scene representation based at least in part on the multi-modal sensor data and the intermediate scene representation. For example, the computing system can generate, using the second network of the machine-learned dynamic object removal model, the scene representation based at least in part on the multi-modal sensor data and the intermediate scene representation. As described herein, the scene representation can include a reconstructed region where the dynamic object has been removed from the depicted portion of the environment. The first network can apply a second level of granularity (e.g., a fine level) when generating the reconstructed region.

At 725, the method 700 can include receiving the scene representation as an output of the machine-learned dynamic object removal model. For example, the computing system can receive the scene representation as the output of the machine-learned dynamic object removal model.

At 730, the method 700 can include generating simulation data based at least in part on the scene representation. For example, the computing system can generate the simulation data based at least in part on the scene representation. As described herein, this can include creating a simulated environment based on metadata or other information encoded in the scene representation such that the static background of the simulated environment replicates (e.g., at least at initiation, t=0) the scene representation. The simulated environment can include one or more simulated dynamic objects. The simulated dynamic object(s) may not be reflective of the types of objects, shapes of objects, color of objects, size of objects, position of objects, etc. that were removed from the scene representation.

Figure 8A:
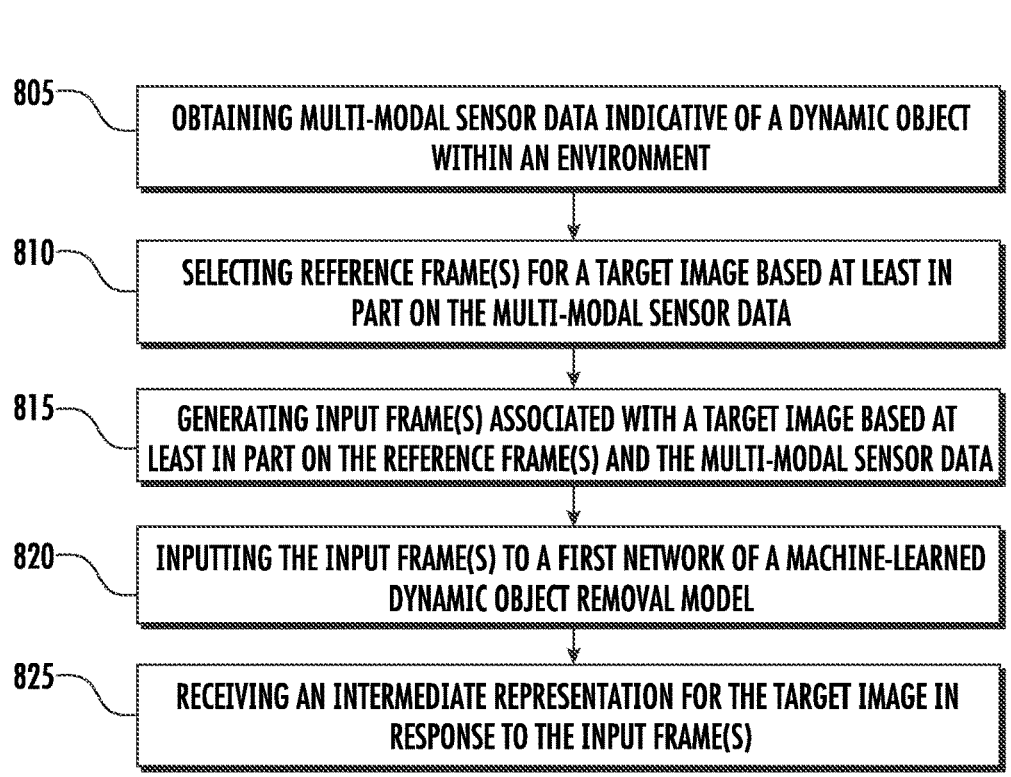
FIG. 8A-B depicts a flowchart of example methods for generating scene representations through multiple machine-learned networks according to aspects of the present disclosure.
Figure 8B:
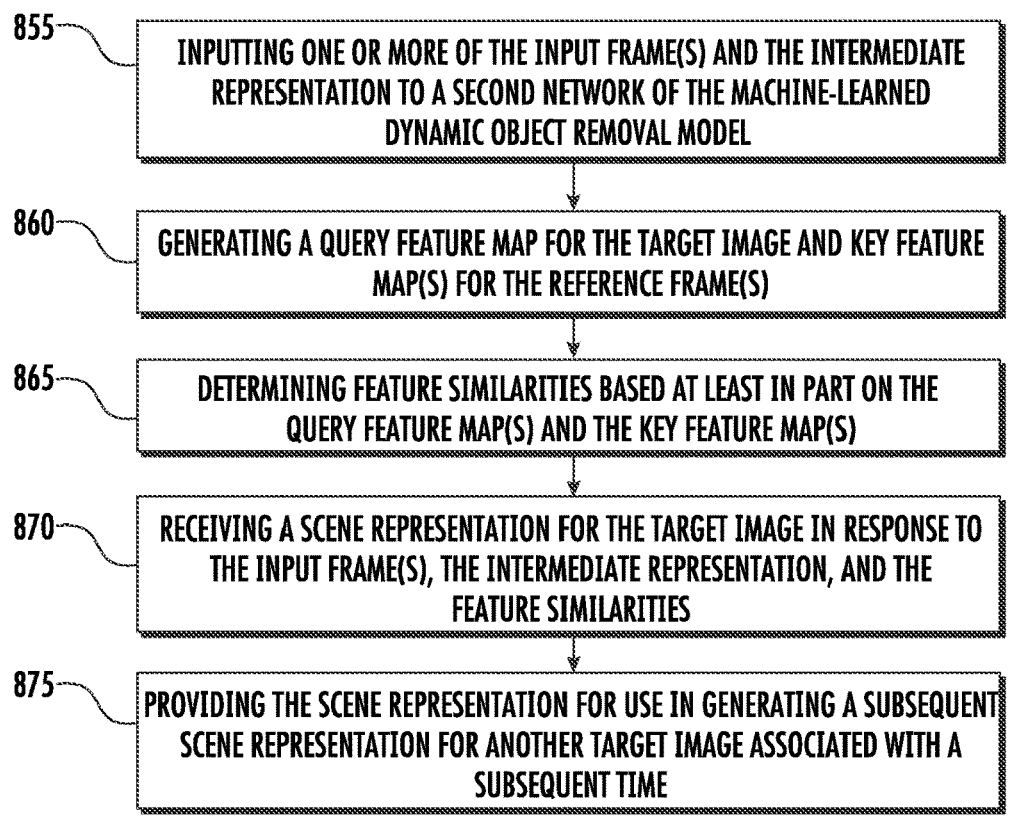

FIGS. 8A-8B depict flowcharts of methods 800 and 850 for generating a scene representation with dynamic objects removed using a multi-network machine-learned model according to aspects of the present disclosure. In particular, method 800 describes a method for generating an intermediate representation of a target image through a first network and method 850 describes a method for generating a scene representation for a target image through a second network. One or more portion(s) of the methods 800, 850 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, simulation system 505, etc.). Each respective portion of the methods 800, 850 can be performed by any (or any combination) of one or more computing devices. Moreover, one or more portion(s) of the methods 800, 850 can be implemented as an algorithm on the hardware components of the device(s) described herein (e.g., as in FIGS. 1-3, 5, 10, etc.), for example, to generate a scene representation using a multi-network machine-learned model. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of methods 800, 850 can be performed additionally, or alternatively, by other systems.

At 805, the method 800 can include obtaining multi-modal sensor data indicative of a dynamic object within an environment. For example, a computing system (e.g., robotic platform 105, vehicle computing system 210, operations computing system(s) 290A, remote computing system(s) 290B, system 300, simulation system 505, etc.) can obtain the multi-modal sensor data indicative of the dynamic object within the environment, as described herein.

At 810, the method 800 can include selecting one or more reference frame(s) for a target image based at least in part on the multi-modal sensor data. For example, the computing system can select the one or more reference frame(s) for the target image based at least in part on the multi-modal sensor data. The target image, for example, can include a three-dimensional image (e.g., a RGBD image) depicting a three-dimensional environment with one or more dynamic objects occluding regions of the three-dimensional environment. The reference frame(s) can include one or more reference three-dimensional image(s) with one or more different viewpoints or timings than the target image (e.g., captured at a different point in time). For instance, the reference frame(s) can be selected based, at least in part, on information provided by the reference frame(s) with respect to the one or more occluded regions of the three-dimensional environment depicted by the target image. By way of example, the information provided by a selected reference frame can give a different perspective (e.g., through a different camera angle, at a different time step, etc.) of a region occluded in the target image.

At 815, the method 800 can include generating one or more input frame(s) associated with the target image based at least in part on the one or more reference frame(s) and the multi-modal sensor data. For example, the computing system can generate the one or more input frame(s) associated with the target image based at least in part on the one or more reference frame(s) and the multi-modal sensor data. The input frame(s), for example, can include at least one of a binary mask for the target image, a semantic layout for the target image, the target image with the at least one dynamic object masked, a depth map for the target image, or an aggregated image based on each of the reference frame(s).

At 820, the method 800 can include inputting the one or more input frame(s) to a first network of a machine-learned dynamic object removal model. For example, the computing system can input the one or more input frame(s) to the first network of the machine-learned dynamic object removal model.

At 825, the method 800 can include receiving an intermediate representation for the target image in response to the one or more input frame(s). For example, the computing system can receive the intermediate representation for the target image in response to the one or more input frame(s). The intermediate representation can include the target image with the one or more occluded regions (e.g., previously occluded by the dynamic objects) inpainted with a coarse-level reconstruction at a first level of granularity.

At 855, the method 850 can include inputting one or more of the input frame(s) and the intermediate representation to a second network of the machine-learned dynamic object removal model. For example, a computing system can input the one or more of the input frame(s) and the intermediate representation to the second network of the machine-learned dynamic object removal model. The one or more input frame(s), for example, can include the binary mask for the target image, the aggregated image from the reference frames, or reprojected images associated with the corresponding reference frames.

At 860, the method 850 can include generating a query feature map for the target image and key feature map(s) for the reference frame(s). For example, the computing system can generate the query feature map for the target image and key feature map(s) for the reference frame(s). For instance, the computing system can utilize an attention module to encode a query feature map for the target image based on pixel, depth, sematic, and binary mask information associated with the target image. In addition, or alternatively, the computing system can utilize the attention module to encode a key feature map for a respective reference frame based on pixel, depth, sematic, and binary mask information associated with the respective reference frame.

At 865, the method 850 can include determining feature similarities based at least in part on the query feature map(s) and the key feature map(s). For example, the computing system can determine feature similarities based on the query feature map(s) and the key feature map(s). For instance, the computing system can obtain a query feature of the query feature map for the target image and key feature(s) from one or more of the key feature map(s) that correspond to the same (or similar) location of the query feature. The computing system can determine a weighted average of the key feature(s) and adjust the query feature of the scene representation based on the weighted average of the key features.

At 870, the method 850 can include receiving a scene representation for the target image in response to the input frame(s), the intermediate representation, and the feature similarities. For example, the computing system can receive the scene representation for the target image in response to the input frame(s), the intermediate representation, and the feature similarities.

At 875, the method 850 can include providing the scene representation for use in generating a subsequent scene representation for another target image associated with a subsequent time. For example, the computing system can provide the scene representation for use in generating the subsequent scene representation for another target image at the subsequent time.

Figure 9:
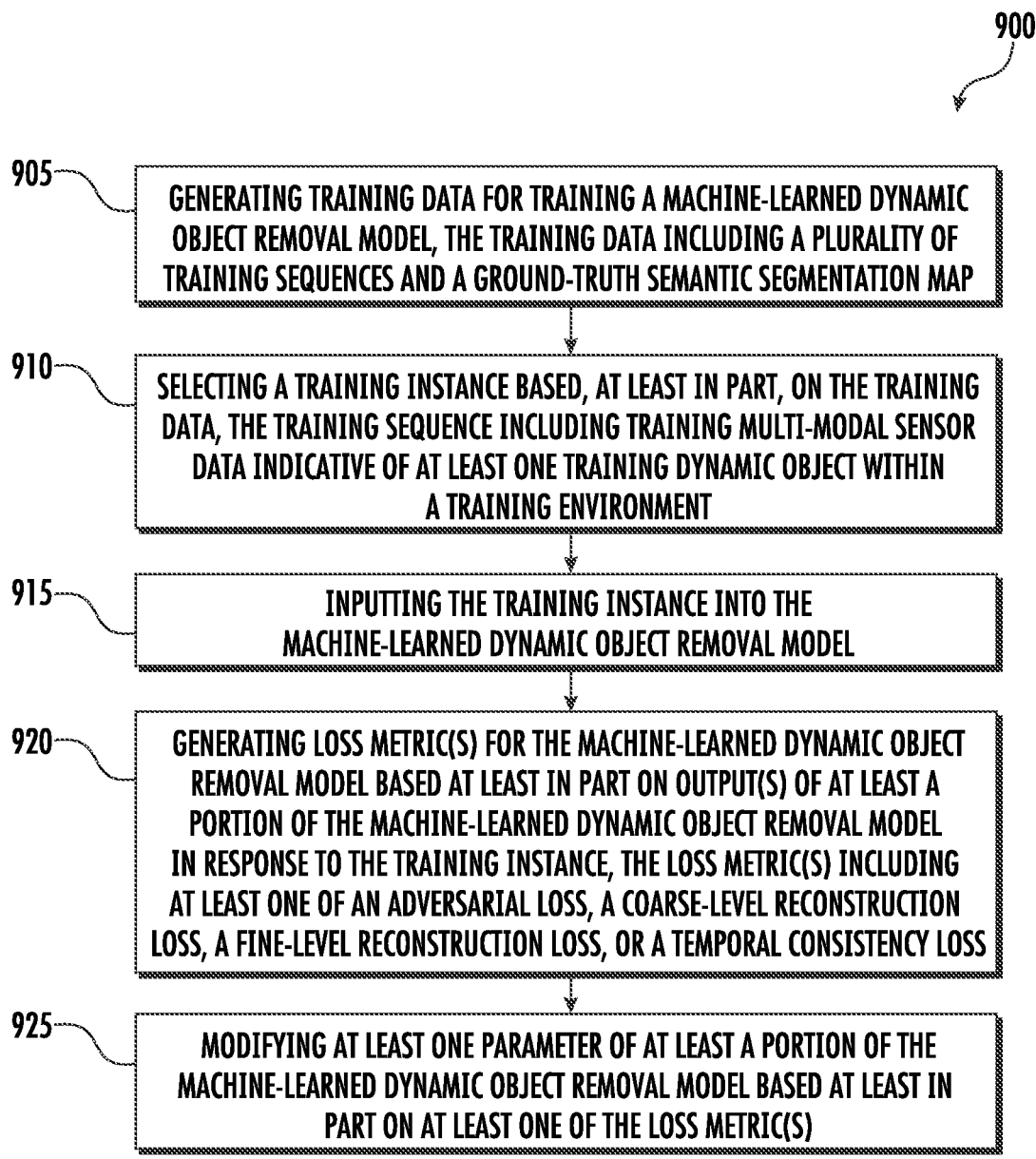
FIG. 9 depicts a flowchart of a method for training an example machine-learned dynamic object removal model according to aspects of the present disclosure.

FIG. 9 depicts a flowchart of a method 900 for training an example machine-learned dynamic object removal model according to aspects of the present disclosure. One or more portion(s) of the method 900 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300, simulation system 505, a system of FIG. 10, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-3, 5, 10, etc.), for example, to train machine-learned models. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 can include generating training data for training a machine-learned dynamic object removal model. For example, a computing system (e.g., robotic platform 105, vehicle computing system 210, operations computing system(s) 290A, remote computing system(s) 290B, system 300, simulation system 505, system of FIG. 10, etc.) can generate the training data for training the machine-learned dynamic object removal model. The training data can include a plurality of training sequences or a ground-truth semantic segmentation map.

The training data can be collected using one or more robotic platforms (e.g., robotic platform 105) or the sensors thereof as the robotic platform is within its environment. By way of example, the training data can be collected using one or more autonomous vehicle(s) (e.g., robotic platform 105, autonomous vehicle 205, etc.) or sensors thereof as the vehicle(s) operates along one or more travel ways. The training data can include a plurality of training sequences (e.g., 143 sequences) divided between multiple datasets (e.g., a training dataset, a validation dataset, or testing dataset). Each training sequence can include a plurality of three-dimensional images (e.g., multi-modal sensor data). In some implementations, each training sequence can include images captured through one or more (e.g., five, etc.) different viewpoints (e.g., through cameras aimed at different camera angles, etc.). By way of example, a training sequence can include a plurality of three-dimensional images concurrently recorded from five different views at 10 Hz.

In some implementations, each sequence can include approximately two-hundred and fifty images from each of a plurality of cameras. In addition, or alternatively, the sequence can include LiDAR point clouds (e.g., collected using LiDAR sensors of a robotic platform) or high definition map information (e.g., structured lane topology data). The plurality of images can be scaled to a resolution of 480×768 pixels for training and evaluation. In some implementations, a "ground-truth" semantic segmentation map can be created in which dynamic objects can be identified.

At 910, the method 900 can include selecting a training instance based, at least in part, on the training data. For example, a computing system can select the training instance based, at least in part, on the training data. The training sequence can include training multi-modal sensor data indicative of at least one training dynamic object within a training environment.

For example, as described above, the training sequence can include a plurality of three-dimensional images from a plurality of different perspectives over a plurality of different timesteps. In addition, in some implementations, the training sequence can include a plurality of synthetic objects (e.g., synthetic three-dimensional object meshes such as car meshes, pedestrian meshes, etc.) rendered within the three-dimensional images. Each object can be assigned one or more feasible trajectories and rendered within at least one of the plurality of images of the training sequence based, at least in part, on the respectively assigned trajectory. In some implementations, the feasible trajectories can be determined based, at least in part, on one or more heuristics such as, for example, vehicle (1) can only travel along lanes; (2) can randomly turn left, right, or continue straight at each intersection; (3) cannot interfere with one another; or any other heuristic for controlling the motion of objects rendered within the training sequence.

At 915, the method 900 can include inputting the training instance into the machine-learned dynamic object removal model. For example, a computing system can input the training instance into the machine-learned dynamic object removal model.

At 920, the method 900 can include generating loss metric(s) for the machine-learned dynamic object removal model based on output(s) of at least a portion of the machine-learned dynamic object removal model in response to the training instance. For example, a computing system can generate the loss metric(s) for the machine-learned dynamic object removal model based on the output(s) of at least the portion of the machine-learned dynamic object removal model in response to the training instance. The loss metric(s), for example, can include at least one of an adversarial loss, a coarse-level reconstruction loss, a fine-level reconstruction loss, or a temporal consistency loss.

In some implementations, the loss metric(s) can be associated with a plurality of loss terms. The loss terms can include at least a first loss term associated with reconstruction at a first level of granularity or a second loss term associated with reconstruction at a second level of granularity. For example, the coarse-level reconstruction loss metric can quantify the accuracy of the reconstruction at the first level of granularity output by at least a portion of the machine-learned dynamic object removal model. As another example, the fine-level reconstruction loss metric can quantify the accuracy of the reconstruction at the second level of granularity output by at least another portion of the machine-learned dynamic object removal model.

At 925, the method 900 can include modifying at least the portion of the machine-learned dynamic object removal model based, at least in part, on at least one of the loss metric(s). For example, a computing system can modify at least the portion of the machine-learned dynamic object removal model based, at least in part, on at least one of the loss metric(s). For example, the machine-learned dynamic object removal model can be trained end-to-end with a discriminator model (e.g., denoted as D).

The machine-learned dynamic object removal model (or portion thereof) can be modified to minimize a loss function associated with the loss metric(s). For example, the machine-learned dynamic object removal model can be trained end-to-end with the discriminator model (e.g., denoted as D) to minimize a Wasserstein distance. By way of example, the model can be trained over the overall training function:

$$\min_{\mathcal{G}} ((\max_{\mathcal{D}} \mathcal{L}_{GAN}(\mathcal{G}, \mathcal{D})) + \mathcal{L}_{course\ pixel}(\mathcal{G}) + \mathcal{L}_{fine\ pixel}(\mathcal{G}) + \mathcal{L}_{temporal}(\mathcal{G}))$$

The terms of the overall training function can include a first term indicative of the adversarial loss metric. The adversarial loss can include a learned adversarial loss based on generative adversarial machine-learning techniques. In addition, the terms can include a second term indicative of the coarse-level reconstruction loss metric. The coarse-level reconstruction loss can be generated for the first network of the machine-learned dynamic object removal model based, at least in part, on an intermediate representation output by the first network. The coarse-level reconstruction loss can be determined based on the function below where V={(1,i), (1, i+1), ..., (1,i+m−1)} includes the training data set described herein.

$$\mathcal{L}_{course\ pixel}(\mathcal{G}) = \sum_{t \in V} \lambda_{course\ image} \|I_t^{(1)} - I_t^{gt}\| + \lambda_{course\ depth} \|D_t^{(1)} - D_t^{gt}\| + \lambda_{course\ sseg} \|S_t^{(1)} - S_t^{gt}\|$$

In addition, the terms of the overall training function can include a third term indicative of the fine-level reconstruction loss metric. The fine-level reconstruction loss can be generated for the second network of the machine-learned dynamic object removal model based, at least in part, on a scene representation output by the second network. The fine-level reconstruction loss can be determined based, at least in part, on a per-pixel reconstruction or a feature-level reconstruction extracted from conv3-3 network. For example, the fine-level reconstruction loss can be determined based on the function below:

$$\mathcal{L}_{fine\ pixel}(\mathcal{G}) = \sum_{t \in V} \lambda_{fine\ image} \|I_t^{(2)} - I_t^{gt}\| + \lambda_{VGG} \|g(I_t^{(2)}) - g(I_t^{gt})\|$$

In some implementations, the terms of the overall training function can include a fourth term indicative of the temporal consistency loss metric. The temporal consistency loss can be generated to train the machine-learned dynamic object removal model to suppress motion blur or flickering. The temporal consistency loss can be determined based on the function below:

$$\mathcal{L}_{temporal}(\mathcal{G}) = \sum_{consecutive\ t,t' \in V} \lambda_{temporal} \|I_t^{(2)} - I_{t'}^2\|$$

Figure 10:
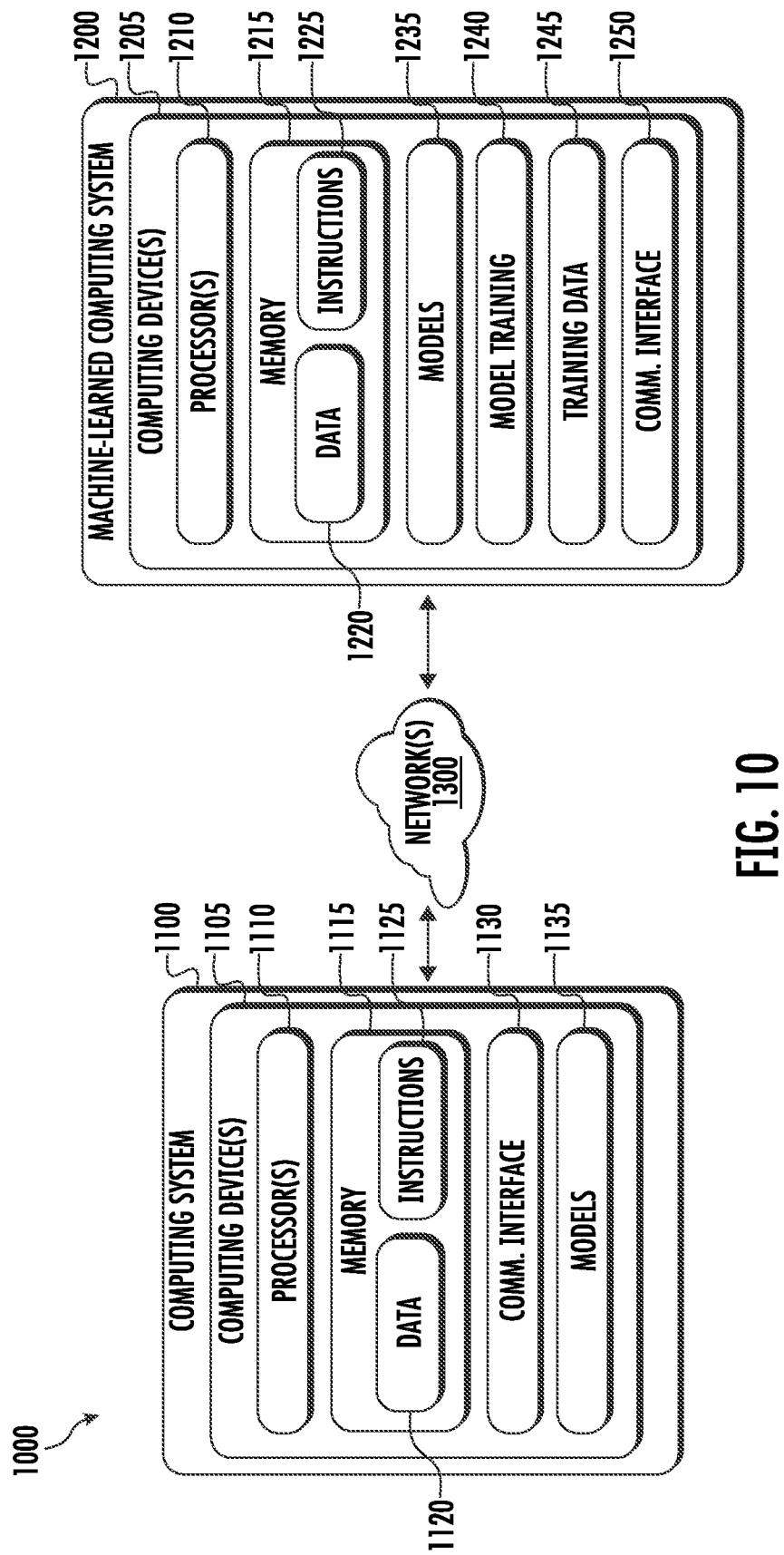
FIG. 10 depicts a block diagram of an example computing system according to example embodiments of the present disclosure.

FIG. 10 depicts a block diagram of an example computing system 1000 according to example embodiments of the present disclosure. The example system 1000 includes a computing system 1100 and a machine learning computing system 1200 that are communicatively coupled over one or more networks 1300.

In some implementations, the computing system 1100 can perform one or more observation tasks such as, for example, by obtaining multi-modal sensor data associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110-4420. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain multi-modal sensor data, removing one or more dynamic objects from the multi-modal sensor data, generating simulation data, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to generate scene representations by removing dynamic objects from multi-modal sensor data.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1210 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, training a machine-learned object removal model, generating simulation data, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled sequential multi-modal sensor data indicative of a plurality of environments at different timesteps. In some implementations, the training data can include a plurality of environments previously recorded by the autonomous vehicle with dynamic objects removed. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1100 can include the model trainer 1240 and the training dataset 1245.

In such implementations, the machine-learned models 1240 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A computing system, comprising:
   one or more processors; and
   one or more computer-readable medium storing instructions that when executed by the one or more processors cause the computing system to perform operations, the operations comprising:
      obtaining multi-modal sensor data indicative of a dynamic object within an environment of an autonomous vehicle, wherein the multi-modal sensor data is associated with a plurality of timesteps including a first timestep and a second timestep;
      providing the multi-modal sensor data indicative of the dynamic object within the environment as an input to a machine-learned dynamic object removal model;
      generating, using the machine-learned dynamic object removal model and based at least in part on the multi-modal sensor data, an intermediate scene representation comprising a coarse reconstructed region based at least in part on removal of the dynamic object, wherein the coarse reconstructed region comprises inpainted data describing features of the environment that were occluded by the dynamic object; and
      generating, using the machine-learned dynamic object removal model and based at least in part on the intermediate scene representation, a scene representation output indicative of at least a portion of the environment comprising a refined reconstructed region based at least in part on removal of the dynamic object.

2. The computing system of claim 1, wherein the intermediate scene representation comprises inpainted pixel data.

3. The computing system of claim 2, wherein the intermediate scene representation comprises inpainted depth data.

4. The computing system of claim 2, wherein the intermediate scene representation comprises inpainted semantic segmentation data.

5. The computing system of claim 1, wherein the machine-learned object removal model comprises:
   a first network configured to generate the intermediate scene representation; and
   a second network configured to generate the scene representation output.

6. The computing system of claim 5, wherein the first network and the second network are trained end-to-end.

7. The computing system of claim 1, wherein the multi-modal sensor data comprises a plurality of image frames, and wherein the machine-learned object removal model is configured to:
   select a subset of image frames from the plurality of image frames based at least in part on a comparison of pixels centered around an area associated with the coarse reconstructed region across the subset of image frames.

8. The computing system of claim 1, wherein obtaining the multi-modal sensor data comprises:
   obtaining, through one or more first sensors and one or more second sensors, sensor data indicative of the dynamic object within the environment, wherein the one or more first sensors are a different type of sensor than the one or more second sensors; and
   generating the multi-modal sensor data based at least in part on the sensor data, the multi-modal sensor data comprising a three-dimensional reconstruction of at least a portion of the environment with the dynamic object.

9. The computing system of claim 1, wherein the refined reconstructed region comprises a static background previously occluded by the dynamic object.

10. The computing system of claim 1, wherein the refined reconstructed region reduces a shadow associated with the dynamic object.

11. The computing system of claim 1, wherein the operations further comprise:
   generating simulation data based at least in part on the scene representation output.

12. The computing system of claim 11, wherein the simulation data comprises:
   a simulated environment that is based at least in part on the scene representation output; and
   one or more simulated dynamic objects designed to move within the simulated environment.

13. The computing system of claim 12, wherein the operations further comprise:
   training a machine-learned model of an autonomous vehicle computing system using the simulation data.

14. An autonomous vehicle, comprising:
   a plurality of sensors comprising at least one first sensor and at least one second sensor, the at least one first sensor being a different type of sensor than the at least one second sensor;
   one or more processors; and
   one or more computer-readable medium storing instructions that when executed by the one or more processors cause the autonomous vehicle to perform operations, the operations comprising:

obtaining, through the at least one first sensor and the at least one second sensor, multi-modal sensor data indicative of a dynamic object within an environment, wherein the multi-modal sensor data is associated with a plurality of timesteps including a first timestep and a second timestep;

providing the multi-modal sensor data indicative of the dynamic object within the environment as an input to a machine-learned dynamic object removal model;

generating, using the machine-learned dynamic object removal model and based at least in part on the multi-modal sensor data, an intermediate scene representation comprising a coarse reconstructed region based at least in part on removal of the dynamic object, wherein the coarse reconstructed region comprises inpainted data describing features of the environment that were occluded by the dynamic object; and generating, using the machine-learned dynamic object removal model and based at least in part on the intermediate scene representation, a scene representation output indicative of at least a portion of the environment comprising a refined reconstructed region based at least in part on removal of the dynamic object.

15. The autonomous vehicle of claim 14, wherein the intermediate scene representation comprises inpainted pixel data.

16. The autonomous vehicle of claim 15, wherein the intermediate scene representation comprises inpainted depth data.

17. The autonomous vehicle of claim 14, wherein the machine-learned object removal model comprises:
- a first network configured to generate the intermediate scene representation; and
- a second network configured to generate the scene representation output.

18. The autonomous vehicle of claim 17, wherein the first network and the second network are trained end-to-end.

19. A computer-implemented method, comprising:

obtaining multi-modal sensor data indicative of a dynamic object within an environment of a robotic platform, wherein the multi-modal sensor data is associated with a plurality of timesteps including a first timestep and a second timestep;

providing the multi-modal sensor data indicative of the dynamic object within the environment as an input to a machine-learned dynamic object removal model;

generating, using the machine-learned dynamic object removal model and based at least in part on the multi-modal sensor data, an intermediate scene representation indicative of at least a portion of the environment comprising a coarse reconstructed region based at least in part on removal of the dynamic object, wherein the coarse reconstructed region comprises inpainted data describing features of the environment that were occluded by the dynamic object; and generating, using the machine-learned dynamic object removal model and based at least in part on the intermediate scene representation, a scene representation output indicative of at least a portion of the environment comprising a refined reconstructed region based at least in part on removal of the dynamic object.

20. The computer-implemented method of claim 19, wherein the robotic platform comprises an autonomous vehicle, and the environment is a surrounding environment of the autonomous vehicle, and wherein the method further comprises:

generating simulation data based at least in part on the first scene representation, wherein the simulation data comprises a simulated environment for simulating autonomous vehicle operation, the simulated environment comprising a scene that is based at least in part on the first scene representation and comprises one or more simulated dynamic objects.

* * * * *